US008908856B2

(12) United States Patent
Kawashima et al.

(10) Patent No.: US 8,908,856 B2
(45) Date of Patent: Dec. 9, 2014

(54) OPERATOR EVALUATION SUPPORT DEVICE AND OPERATOR EVALUATION SUPPORT METHOD

(71) Applicant: Fujitsu Limited, Kawasaki, Kanagawa (JP)

(72) Inventors: Naoto Kawashima, Yokohama (JP); Naoto Matsudaira, Yokohama (JP); Yuusuke Tounai, Nishi (JP); Hiroshi Yoshida, Yokohama (JP); Shingo Hirono, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/020,194

(22) Filed: Sep. 6, 2013

(65) Prior Publication Data
US 2014/0010362 A1 Jan. 9, 2014

Related U.S. Application Data

(63) Continuation of application No. PCT/JP2011/056462, filed on Mar. 17, 2011.

(51) Int. Cl.
*H04M 3/00* (2006.01)
*H04M 5/00* (2006.01)
*G06Q 10/00* (2012.01)
*H04M 3/51* (2006.01)

(52) U.S. Cl.
CPC ............ *H04M 3/5175* (2013.01); *G06Q 10/00* (2013.01)
USPC ............ 379/265.07; 379/265.03; 379/265.06

(58) Field of Classification Search
USPC ............ 379/265.02, 265.03, 265.06, 265.07, 379/265.08, 265.09, 266.02
See application file for complete search history.

(56) References Cited

U.S. PATENT DOCUMENTS

| 8,130,937 | B1 * | 3/2012 | Thenthiruperai et al. .................. 379/266.02 |
| 2002/0016783 | A1 | 2/2002 | Kayaba et al. |

(Continued)

FOREIGN PATENT DOCUMENTS

| JP | 2001-331624 | 11/2001 |
| JP | 2002-51153 | 2/2002 |

(Continued)

OTHER PUBLICATIONS

International Search Report mailed May 17, 2011 in corresponding International Application No. PCT/JP2011/056462.

(Continued)

*Primary Examiner* — Antim Shah
(74) *Attorney, Agent, or Firm* — Staas & Halsey LLP

(57) ABSTRACT

An operator evaluation support device includes a speech recording unit that records speech times of a customer and an operator during a telephone call; a display recording unit that records a display time of a screen on an operator terminal, with screen identification information; a content recording unit that records screen content information with the screen identification information; a providing unit that creates call information indicating the speech times, the display time, and the screen content information, and sends the call information and voice files of speeches of the customer and the operator to an administrator terminal; and a determining unit that receives, from the administrator terminal, a selection of the speech, and when the selected speech is included in a predetermined time from a switching timing of the screen, the determining unit determines, as play speeches, the selected speech and another speech included in the predetermined time.

12 Claims, 30 Drawing Sheets

(56) References Cited

U.S. PATENT DOCUMENTS

| | | |
|---|---|---|
| 2005/0201546 A1 | 9/2005 | Yanase et al. |
| 2006/0136247 A1 | 6/2006 | Onodera et al. |
| 2007/0154006 A1 | 7/2007 | Onodera et al. |
| 2007/0206766 A1 | 9/2007 | Keren et al. |
| 2008/0063179 A1* | 3/2008 | Elazar et al. ............. 379/265.09 |

FOREIGN PATENT DOCUMENTS

| | | |
|---|---|---|
| JP | 2003-122890 | 4/2003 |
| JP | 2005-72896 | 3/2005 |
| JP | 2005-258551 | 9/2005 |
| JP | 2005-293180 | 10/2005 |
| JP | 2006-171579 | 6/2006 |
| JP | 2006-208482 | 8/2006 |
| JP | 2007-58767 | 3/2007 |
| JP | 2007-74175 | 3/2007 |
| JP | 2007-184699 | 7/2007 |
| JP | 2007-286097 | 11/2007 |
| JP | 2007-288242 | 11/2007 |

OTHER PUBLICATIONS

Patent Abstracts of Japan, Publication No. 2006-171579, Published Jun. 29, 2006.
Patent Abstracts of Japan, Publication No. 2007-058767, Published Mar. 8, 2007.
Patent Abstracts of Japan, Publication No. 2001-331624, Published Nov. 30, 2001.
Patent Abstracts of Japan, Publication No. 2002-051153, Published Feb. 15, 2002.
Patent Abstracts of Japan, Publication No. 2003-122890, Published Apr. 25, 2003.
Patent Abstracts of Japan, Publication No. 2005-258551, Published Sep. 22, 2005.
Patent Abstracts of Japan, Publication No. 2005-293180, Published Oct. 20, 2005.
Patent Abstracts of Japan, Publication No. 2007-074175, Published Mar. 22, 2007.
Patent Abstracts of Japan, Publication No. 2007-286097, Published Nov. 1, 2007.
International Search Report of PCT/JP2011/055279 mailed May 17, 2011.
U.S. Office Action mailed Aug. 7, 2014 in U.S. Appl. No. 14/017,733.
Patent Abstracts of Japan, Publication No. 2005-072896, Published Mar. 17, 2005.
Patent Abstracts of Japan, Publication No. 2006-208482, Published Aug. 10, 2006.
Patent Abstracts of Japan, Publication No. 2007-288242, Published Nov. 1, 2007.

* cited by examiner

FIG.5

| CUSTOMER ID | TELEPHONE NUMBER | CUSTOMER | ADDRESS | PURCHASED PRODUCT MODEL NUMBER | PURCHASED STORE |
|---|---|---|---|---|---|
| 986569 | 0441234567 | HANAKO SUZUKI | TAMA-KU, KAWASAKI-SHI, KANAGAWA-KEN · · · | VS78359 | TAMA STORE |
| 8645525 | 0331234567 | JIRO FUJI | SHIBUYA-KU, TOKYO · · · · | GF0976 | SHIBUYA STORE |
| 4237647 | 0451234567 | TARO YAMADA | YOKOHAMA-SHI, KANAGAWA-KEN · · · · | KJ98746 | YOKOHAMA STORE |
| 376495 | 0339876543 | SATO | NERIMA-KU, TOKYO · · · · · | KK076554 | NERIMA STORE |

FIG.6

| CALL ID | INQUIRY DATE | INQUIRY TIME | INQUIRY CUSTOMER | OPERATOR ID |
|---|---|---|---|---|
| 7840128 | 2010/8/31 | 10:00 | 986569 | 2000 |
| 7840129 | 2010/9/1 | 16:34 | 8645525 | 2010 |
| 7840130 | 2010/9/3 | 17:32 | 4237647 | 1009 |
| 7840131 | 2010/9/3 | 12:34 | 376495 | 3000 |

FIG.7

| PRODUCT CATEGORY | SERIES | QUESTION GENRE | ANSWER |
|---|---|---|---|
| IRON | VS | POWER SOURCE SYSTEM | WHEN THE POWER SOURCE DOES NOT TURN ON... |
| IRON | VT | OPERATION SYSTEM | WHEN THE SWITCH DOES NOT TURN ON... |
| IRON | VT | OPERATION SYSTEM | WHEN OPERATION DOES NOT START EVEN IF SWITCH IS TOLD... |
| IRON | VU | POWER SOURCE SYSTEM | AS SOON AS SWITCHING TO WIRELESS, THE POWER SOURCE... |

| PRODUCT CATEGORY | SERIES | RELEASE YEAR | MANUAL DATA |
|---|---|---|---|
| IRON | VS | 2000 | IVS2000.pdf |
| IRON | VT | 2001 | IVT2001.pdf |
| IRON | VU | 2002 | IVU2002.pdf |
| IRON | VV | 2003 | IVV2003.pdf |

FIG.9

| OPERATOR ID | OPERATOR NAME | STATUS |
|---|---|---|
| 2000 | HANAKO TANAKA | ATTENDING TO A CALL |
| 2010 | ○○○○ | AVAILABLE |
| 2020 | × × × × | ATTENDING TO A CALL |
| 2030 | △△△△ | AVAILABLE |

FIG.10

| CALL ID | VOICE FILE NAME | LEFT CHANNEL SPEAKER | RIGHT CHANNEL SPEAKER |
|---|---|---|---|
| 7840128 | 100801102320000.wav | OPERATOR | CUSTOMER |
| 7840129 | 100901163420010.wav | OPERATOR | CUSTOMER |
| 7840130 | 100903173210009.wav | OPERATOR | CUSTOMER |
| 7840131 | 100903123430000.wav | OPERATOR | CUSTOMER |

| CALL ID | TIME | CONTENT |
|---|---|---|
| 7840128 | 10:00:00 | OPERATOR SPEECH START |
| 7840128 | 10:00:17 | OPERATOR SPEECH END |
| 7840128 | 10:00:17 | CUSTOMER SPEECH START |
| 7840128 | 10:00:19 | CUSTOMER SPEECH END |
| 7840128 | 10:00:21 | OPERATOR SPEECH START |
| 7840128 | 10:00:27 | CUSTOMER SPEECH START |
| 7840128 | 10:00:28 | OPERATOR SPEECH END |
| 7840128 | 10:00:30 | CUSTOMER SPEECH END |
| 7840128 | 10:00:32 | OPERATOR SPEECH START |
| 7840128 | 10:00:44 | OPERATOR SPEECH END |
| 7840128 | 10:00:45 | CUSTOMER SPEECH START |
| 7840128 | 10:00:47 | CUSTOMER SPEECH END |
| 7840128 | 10:00:49 | OPERATOR SPEECH START |
| 7840128 | 10:00:59 | OPERATOR SPEECH END |
| 7840128 | 10:00:59 | CUSTOMER SPEECH START |
| 7840128 | 10:01:01 | CUSTOMER SPEECH END |
| 7840128 | 10:01:03 | OPERATOR SPEECH START |
| 7840128 | 10:01:16 | OPERATOR SPEECH END |
| 7840128 | 10:01:16 | CUSTOMER SPEECH START |
| 7840128 | 10:01:18 | CUSTOMER SPEECH END |
| 7840128 | 10:01:21 | OPERATOR SPEECH START |
| 7840128 | 10:01:34 | CUSTOMER SPEECH START |

| CALL ID | TIME | CONTENT |
|---|---|---|
| 7840128 | 10:01:35 | OPERATOR SPEECH END |
| 7840128 | 10:01:36 | CUSTOMER SPEECH END |
| 7840128 | 10:01:38 | OPERATOR SPEECH START |
| 7840128 | 10:01:43 | OPERATOR SPEECH END |
| 7840128 | 10:01:43 | CUSTOMER SPEECH START |
| 7840128 | 10:01:45 | CUSTOMER SPEECH END |
| 7840128 | 10:01:47 | OPERATOR SPEECH START |
| 7840128 | 10:01:50 | OPERATOR SPEECH END |
| 7840128 | 10:01:50 | CUSTOMER SPEECH START |
| 7840128 | 10:01:53 | CUSTOMER SPEECH END |
| 7840128 | 10:01:55 | OPERATOR SPEECH START |
| 7840128 | 10:02:04 | OPERATOR SPEECH END |
| 7840128 | 10:02:05 | CUSTOMER SPEECH START |
| 7840128 | 10:02:06 | CUSTOMER SPEECH END |
| 7840128 | 10:02:08 | OPERATOR SPEECH START |
| 7840128 | 10:02:14 | OPERATOR SPEECH END |

| MANUAL NAME | PAGE | SCREEN DATA |
|---|---|---|
| XJ PRODUCT EXPLANATION | 1 | xj01.pdf |
| | 2 | xj02.pdf |
| | 3 | xj03.pdf |
| | 4 | xj04.pdf |
| | 5 | xj05.pdf |
| | 6 | xj06.pdf |
| CY PRODUCT INTRODUCTION | 1 | cy01.pdf |
| | 2 | cy02.pdf |
| | 3 | cy03.pdf |
| | 4 | cy04.pdf |
| | 5 | cy05.pdf |
| | 6 | cy06.pdf |
| | 7 | cy07.pdf |

FIG.13

| TIME | CALL ID | SUMMARY | PAGE | OPERATION |
|---|---|---|---|---|
| 10:00:30 | 784128 | MANUAL: XJ PRODUCT EXPLANATION | 1 | DISPLAY |
| 10:00:57 | 784128 | MANUAL: XJ PRODUCT EXPLANATION | 1 | HIDE |
| 10:00:57 | 784128 | MANUAL: XJ PRODUCT EXPLANATION | 2 | DISPLAY |
| 10:01:26 | 784128 | MANUAL: XJ PRODUCT EXPLANATION | 2 | HIDE |
| 10:01:26 | 784128 | FAQ | POWER SOURCE SYSTEM | DISPLAY |
| 10:01:45 | 784128 | FAQ | POWER SOURCE SYSTEM | HIDE |

FIG.21

PROCESS RANGE SELECTION SCREEN
PLEASE SELECT THE RANGE OF THE CALL TO BE
AN OBJECT OF CREATING A TABLE THIS TIME.

◉ SPECIFY CALL ID
CALL ID _____

○ SPECIFY CONDITION
DATE RANGE _____ ~ _____
OPERATOR ID _____

[ EXECUTE ]   [ CANCEL ]

OPERATOR EVALUATION SUPPORT DEVICE AND OPERATOR EVALUATION SUPPORT METHOD

CROSS-REFERENCE TO RELATED APPLICATION

This application is a U.S. continuation application filed under 35 USC 111(a) claiming benefit under 35 USC 120 and 365(c) of PCT Application JP2011/056462 filed on Mar. 17, 2011, the entire contents of which are incorporated herein by reference.

FIELD

The embodiments discussed herein are related to an operator evaluation support device and an operator evaluation support method for supporting the evaluation of an operator.

BACKGROUND

In recent years, importance has been placed on improving the quality of an operator's telephone calls at call centers. The evaluation of the call quality of an operator is made by, for example, a supervisor controlling the operators. For example, a supervisor selects each one of the voice files of speeches from a graph (speech time period graph) indicating the speech time periods of the customer and the operator, and plays the selected voice files, to recognize the contents of each speech and evaluate the call quality of the operator. Furthermore, when a voice recognition process is not performed on the voice file, it is difficult to recognize the relationship between the contents of the speech of the operator and the plurality of voice files from the speech time period graph, and therefore it is difficult to predict the portion of the problem in the speech of the operator.

As described above, unless the voice file of the speech is played, the supervisor is unable to easily recognize the portion of the problem in the speech of the operator. In terms of selecting and playing the voice file of speech, for example, the following conventional technologies are known.

There is conventionally known a technology of playing the voice files of the question and the answer in coordination with each other (see patent document 1).

Furthermore, there is conventionally known a technology of playing a plurality of voice files without recognizing the contents of the voice files in advance (see patent document 2).

Patent document 1: Japanese Laid-Open Patent Publication No. 2006-171579

Patent document 2: Japanese Laid-Open Patent Publication No. 2007-58767

However, in the technology of patent document 1 disclosing the conventional technology of playing the voice files of the question and the answer in coordination with each other, the contents of the voice file are recognized, the structure of the question and answer is created, and then the selection and a request to play are received. Therefore, a technology of recognizing the contents of the voice files is to be prepared in advance, which leads to an expensive device.

Furthermore, in the technology of patent document 2 disclosing the conventional technology of playing a plurality of voice files without recognizing the contents of the voice files in advance, a voice file is created for each speech, and a plurality of voice files included in a specified time period are played. Therefore, the portion of the problem in the speech of the operator is not easily recognized.

As described above, the supervisor has been incapable of easily finding the portion of the problem in a call from the customer attended to by the operator. Furthermore, in order for the supervisor to appropriately supervise the operator, the supervisor is to recognize the portion of the problem in the operator's speech. However, unless the voice file of the speech is played, the supervisor does not know the specific contents of the call.

Furthermore, even when the voice file of the speech is played, the supervisor is to sequentially listen to the call from the beginning, because the supervisor is unaware of where the problem is in the call. This method is time-consuming and inefficient. Thus, there have been cases where the supervisor is unable to sufficiently confirm the contents of the call, and consequently incapable of giving appropriate supervision.

SUMMARY

According to an aspect of the embodiments, an operator evaluation support device includes a speech recording unit configured to record speech times of a customer and an operator during a telephone call from the customer to which the operator attends; a display recording unit configured to record a display time during which a display screen is displayed during the telephone call on an operator terminal used by the operator, in association with display screen identification information for identifying the display screen; a content recording unit configured to record screen content information describing a content of the display screen, in association with the display screen identification information of the display screen displayed on the operator terminal; a providing unit configured to refer to the speech recording unit, the display recording unit, and the content recording unit with respect to the telephone call, create telephone call information indicating the speech times of the customer and the operator, the display time of the display screen displayed on the operator terminal, and the screen content information corresponding to the display screen, and send the telephone call information and voice files of speeches of the customer and the operator included in the telephone call information to an administrator terminal used by an administrator who is evaluating the operator; and a determining unit configured to receive, from the administrator terminal, a selection of the speech of the customer or the operator included in the telephone call information, and when the selected speech is included in a predetermined time from a switching timing of the display screen displayed on the operator terminal, the determining unit determines, as play speeches, the selected speech and also another speech included in the predetermined time.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 5 is a configuration diagram of a customer DB;

FIG. 6 is a configuration diagram of a question DB;

FIG. 7 is a configuration diagram of a FAQ DB;

FIG. 8 is a configuration diagram of a product DB;

FIG. 9 is a configuration diagram of an operator DB;

FIG. 10 is a configuration diagram of a voice DB;

FIG. 11 is a configuration diagram of a speech time DB;

FIG. 12 is a configuration diagram of a manual DB;

FIG. 13 is a configuration diagram of a page switch DB;

FIG. 21 is an image diagram of a process range selection screen;

DESCRIPTION OF EMBODIMENTS

Preferred embodiments of the present invention will be explained with reference to accompanying drawings.

Figure 1:
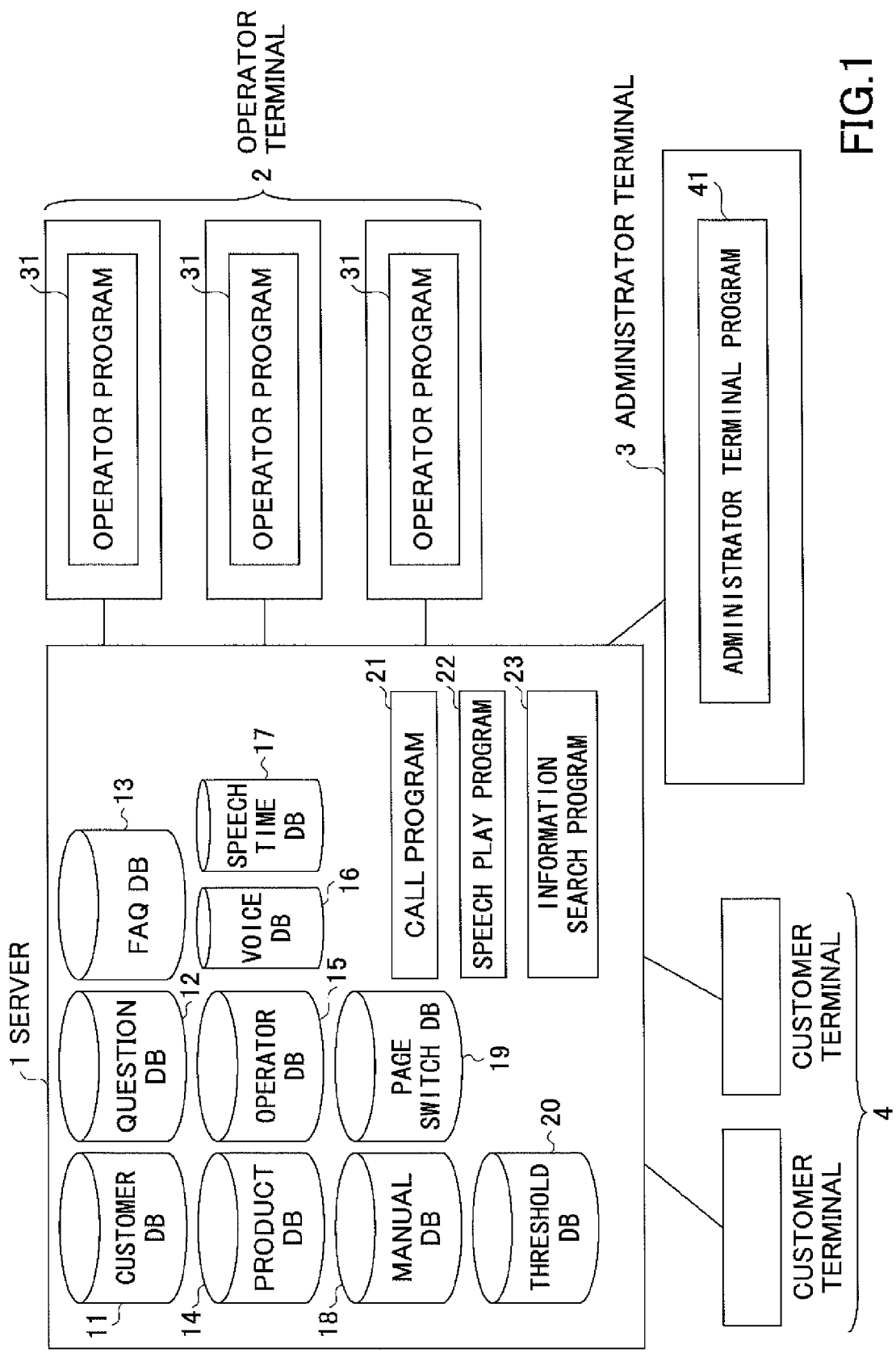
FIG. 1 illustrates a configuration of a call center system according to an embodiment.

FIG. 1 illustrates a configuration of a call center system according to the present embodiment. The call center system of FIG. 1 includes a server 1, an operator terminal 2, an administrator terminal 3, and a customer terminal 4. The server 1 is an example of an operator evaluation support device.

The server 1 is connected to the operator terminal 2, the administrator terminal 3, and the customer terminal 4 via a predetermined network such as the Internet, a LAN (Local Area Network), and a public network.

The server 1 includes a customer DB 11, a question DB 12, a FAQ DB 13, a product DB 14, an operator DB 15, a voice DB 16, a speech time DB 17, a manual DB 18, a page switch DB 19, a threshold DB 20, a call program 21, a speech play program 22, and an information search program 23. Furthermore, the operator terminal 2 includes an operator program 31. The administrator terminal 3 includes an administrator terminal program 41. The administrator terminal 3 is operated by a supervisor, who is an example of the administrator.

The server 1 executes the call program 21, the speech play program 22, and the information search program 23. By executing the call program 21, the server 1 connects with the customer terminal 4 and the operator terminal 2, records calls, and sends information of the customer to the operator terminal 2.

Furthermore, by executing the speech play program 22, the server 1 creates information used by the supervisor for evaluating the operator, and sends information used by the supervisor for evaluating the operator to the administrator terminal 3.

Furthermore, by executing the information search program 23, the server 1 searches the manual DB 18 for information, sends the search results to the operator terminal 2, and records the contents of the information sent to the operator terminal 2 and the times at which the information is displayed and hidden at the operator terminal 2.

The operator terminal 2 executes the operator program 31. By executing the operator program 31, the operator terminal 2 displays information of the customer received from the server 1, and displays the search results of the information from the manual DB 18.

The administrator terminal 3 executes the administrator terminal program 41. By executing the administrator terminal program 41, the administrator terminal 3 displays information used by the supervisor for evaluating the operator, which has been received from the server 1. Note that the customer terminal 4 may be any device having a telephone function, such as a telephone, and a PC having a telephone function.

The customer DB 11 records information relevant to the customer. The question DB 12 records information relevant to inquiries from the customer. The FAQ DB 13 records information relevant to FAQ (Frequently Asked Questions). The product DB 14 records information relevant to products.

The operator DB 15 records information relevant to the state of the operator (attending to a call, available, etc.). The voice DB 16 records information relevant to a voice file. The speech time DB 17 records information relevant to the speech of the customer and the operator, such as the timing of the speech of the customer and the operator.

The manual DB 18 records the screen data and the standard duration of each section (page) of the manual. The page switch DB 19 records information relevant to the operation of displaying or the hiding of the manual performed by the operator. The threshold DB 20 records threshold time described below.

Figure 2:
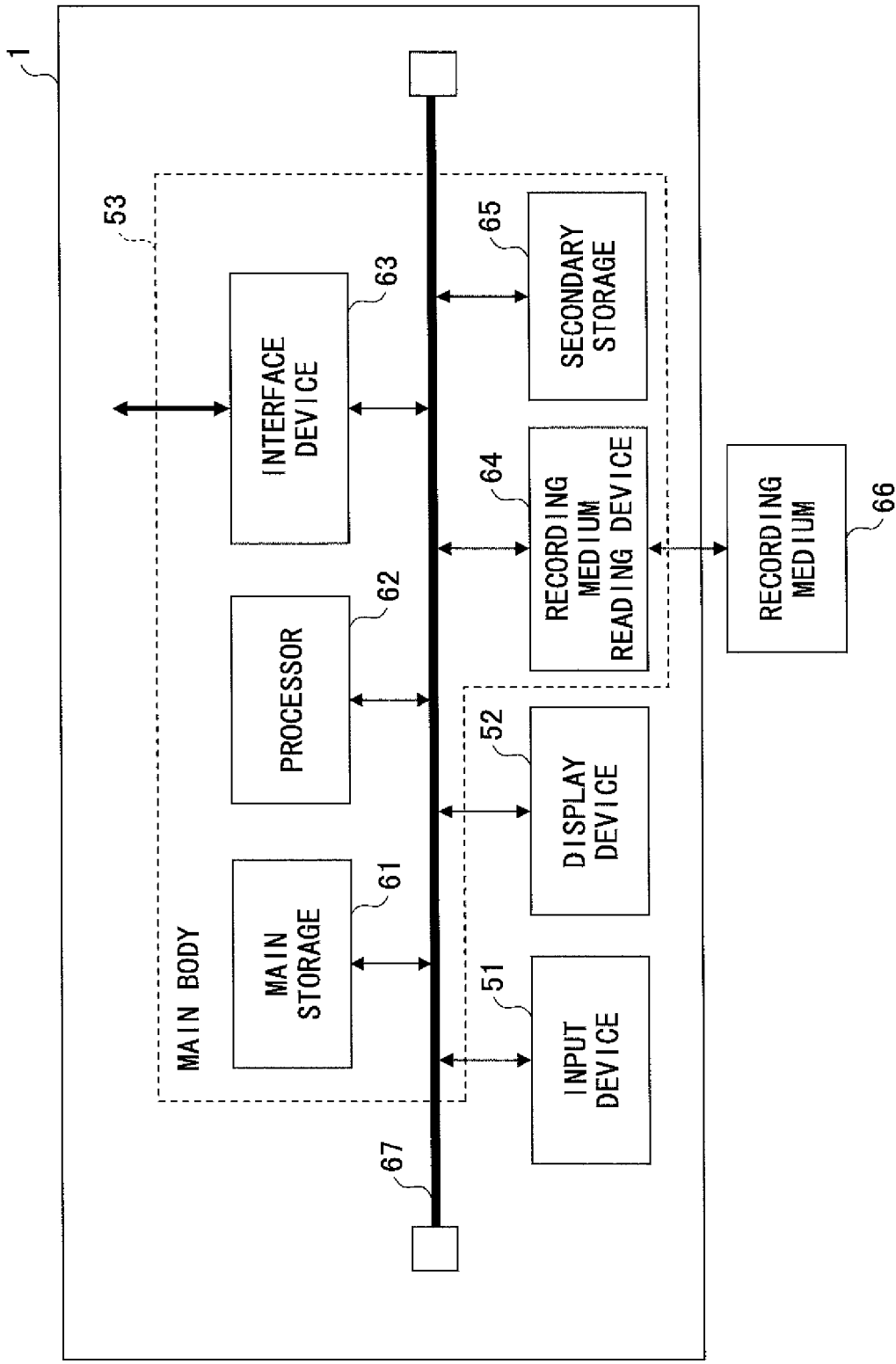
FIG. 2 is a hardware configuration diagram of a server.

FIG. 2 is a hardware configuration diagram of the server. The server 1 illustrated in FIG. 2 includes an input device 51, a display device 52, and a main body 53. The main body 53 includes a main storage 61, a processor 62, an interface device 63, a recording medium reading device 64, and a secondary storage 65, which are interconnected by a bus 67. The input device 51 and the display device 52 are connected to the bus 67.

The input device 51, the display device 52, the main storage 61, the processor 62, the interface device 63, the recording medium reading device 64, and the secondary storage 65, which are interconnected by the bus 67, may exchange data with each other under the control of the processor 62. The processor 62 is a CPU (Central Processing Unit) that controls the operations of the entire server 1.

The interface device 63 receives data from the operator terminal 2, the administrator terminal 3, and the customer terminal 4, and passes the contents of the data to the processor 62. Furthermore, the interface device 63 sends data to the operator terminal 2, the administrator terminal 3, and the customer terminal 4 according to instructions from the processor 62.

The secondary storage 65 stores an operator evaluation support program that causes a computer to perform a process in at least the operator evaluation support device, as part of the program for causing the server 1 to exhibit the same functions as the operator evaluation support device. The operator evaluation support program includes the call program 21, the speech play program 22, and the information search program 23.

Then, as the processor 62 reads the operator evaluation support program from the secondary storage 65 and executes the operator evaluation support program, the server 1 functions as an operator evaluation support device. The operator evaluation support program may be stored in the main storage 61 accessible by the processor 62. The input device 51 receives input of data under the control of the processor 62. The operator evaluation support program may be recorded in a recording medium 66 readable by the server 1.

The recording medium 66 readable by the server 1 may be a magnetic recording medium, an optical disk, a magneto-optical recording medium, and a semiconductor memory. Examples of the magnetic recording medium are a HDD, a flexible disk (FD), and a magnetic tape (MT). Examples of an optical disk are a DVD (Digital Versatile Disc), a DVD-RAM, a CD-ROM (Compact Disc-Read Only Memory), and a CD-R (Recordable)/RW (ReWritable). An example of a magneto-optical recording medium is a MO (Magneto-Optical disk).

When distributing the operator evaluation support program, for example, a portable recording medium 66 such as a DVD and a CD-ROM recording the operator evaluation support program may be sold.

For example, in the server 1 executing the operator evaluation support program, the recording medium reading device 64 reads the operator evaluation support program from the recording medium 66 recording the operator evaluation support program. The processor 62 stores the read operator evaluation support program in the main storage 61 or the secondary storage 65. The server 1 reads the operator evaluation support program from the main storage 61 or the secondary storage 65 that is a storage device included in itself, and executes a process in accordance with the operator evaluation support program.

Figure 3:
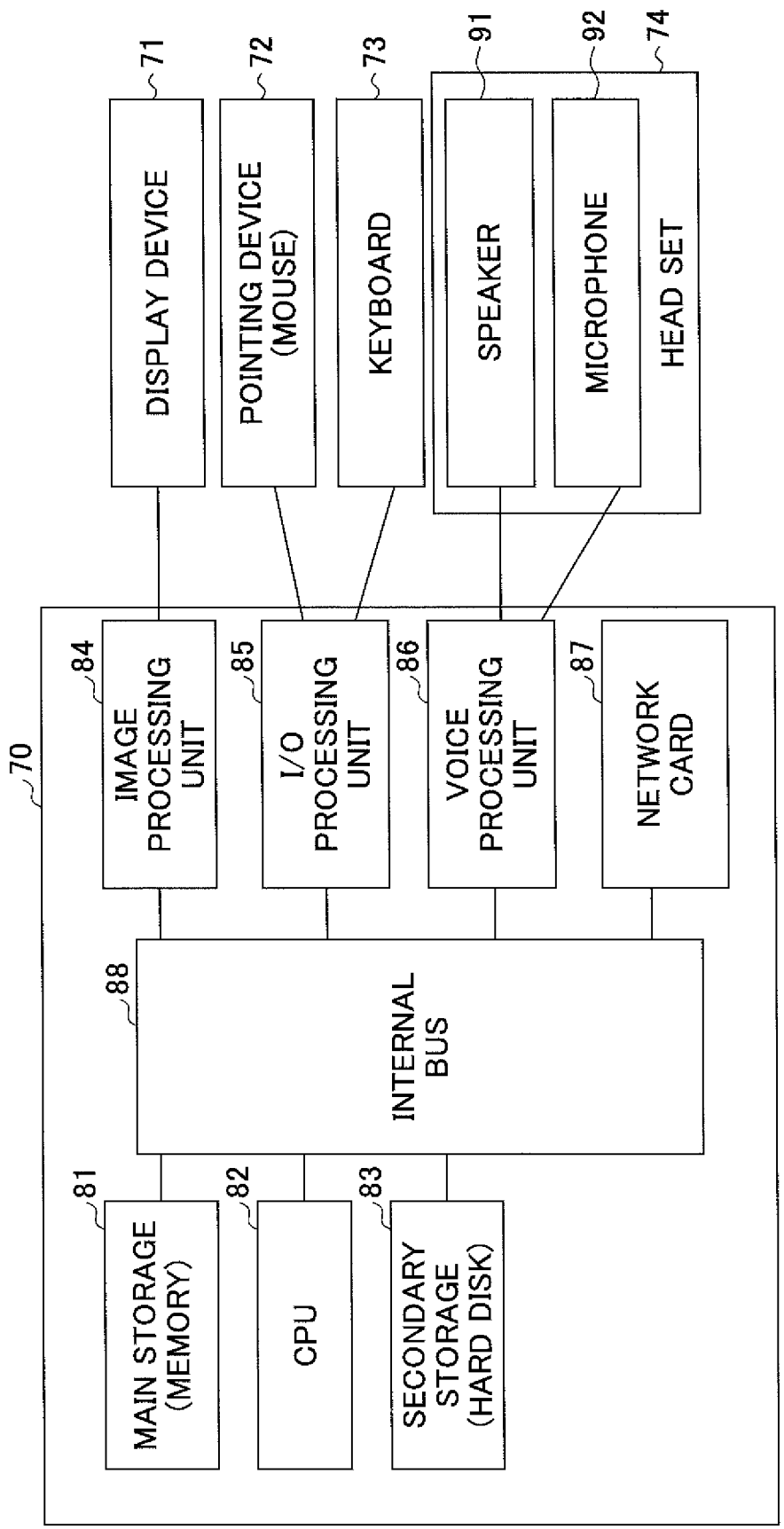
FIG. 3 is a hardware configuration diagram of an operator terminal and an administrator terminal.

FIG. 3 is a hardware configuration diagram of the operator terminal 2 and the administrator terminal 3. The operator terminal 2 and the administrator terminal 3 have the same hardware configuration. Thus, in the following, a description is given of the hardware configuration of the operator terminal 2. A description of the hardware configuration of the administrator terminal 3 is omitted.

The operator terminal 2 of FIG. 3 includes a main body 70, a display device 71, a pointing device 72, a keyboard 73, and a head set 74. The main body 70 includes a main storage 81, a CPU 82, a secondary storage 83, an image processing unit 84, an I/O processing unit 85, a voice processing unit 86, and a network card 87, which are interconnected by an internal bus 88. The head set 74 includes a speaker 91 and a microphone 92.

The main storage 81, the secondary storage 83, the image processing unit 84, the I/O processing unit 85, the voice processing unit 86, and the network card 87, which are interconnected by the internal bus 88, may exchange data under the control of the CPU 82. The CPU 82 is a Central Processing Unit that controls the operations of the entire operator terminal 2.

The image processing unit 84 is for performing various processes for displaying an image with the display device 71. The I/O processing unit 85 processes the input and output of data with the pointing device 72 and the keyboard 73. The voice processing unit 86 processes voice data exchanged with the speaker 91 and the microphone 92 of the head set 74.

The network card 87 receives data from the server 1, and passes the contents of the data to the CPU 82. Furthermore, the network card 87 sends data to the server 1 according to instructions from the CPU 82.

For example, in the operator terminal 2, the operator program 31 is installed. The operator terminal 2 executes the operator program 31. In the main storage 81, as part of a program for operating the operator terminal 2, at least the operator program 31 is stored. The CPU 82 reads the operator program 31 from the main storage 81 and executes the operator program 31.

The operator program 31 may be recorded in a recording medium readable by the operator terminal 2. When distributing the operator program 31, for example, a portable recording medium such as a DVD and a CD-ROM recording the operator program 31 may be sold. An application distribution mechanism on the Internet may be used.

The operator terminal 2 that executes the operator program 31 reads the operator program 31 from a recording medium recording the operator program 31. The CPU 82 stores the operator program 31 in the main storage 81. The CPU 82 reads the operator program 31 from the main storage 81, and executes a process according to the operator program 31.

Figure 4:
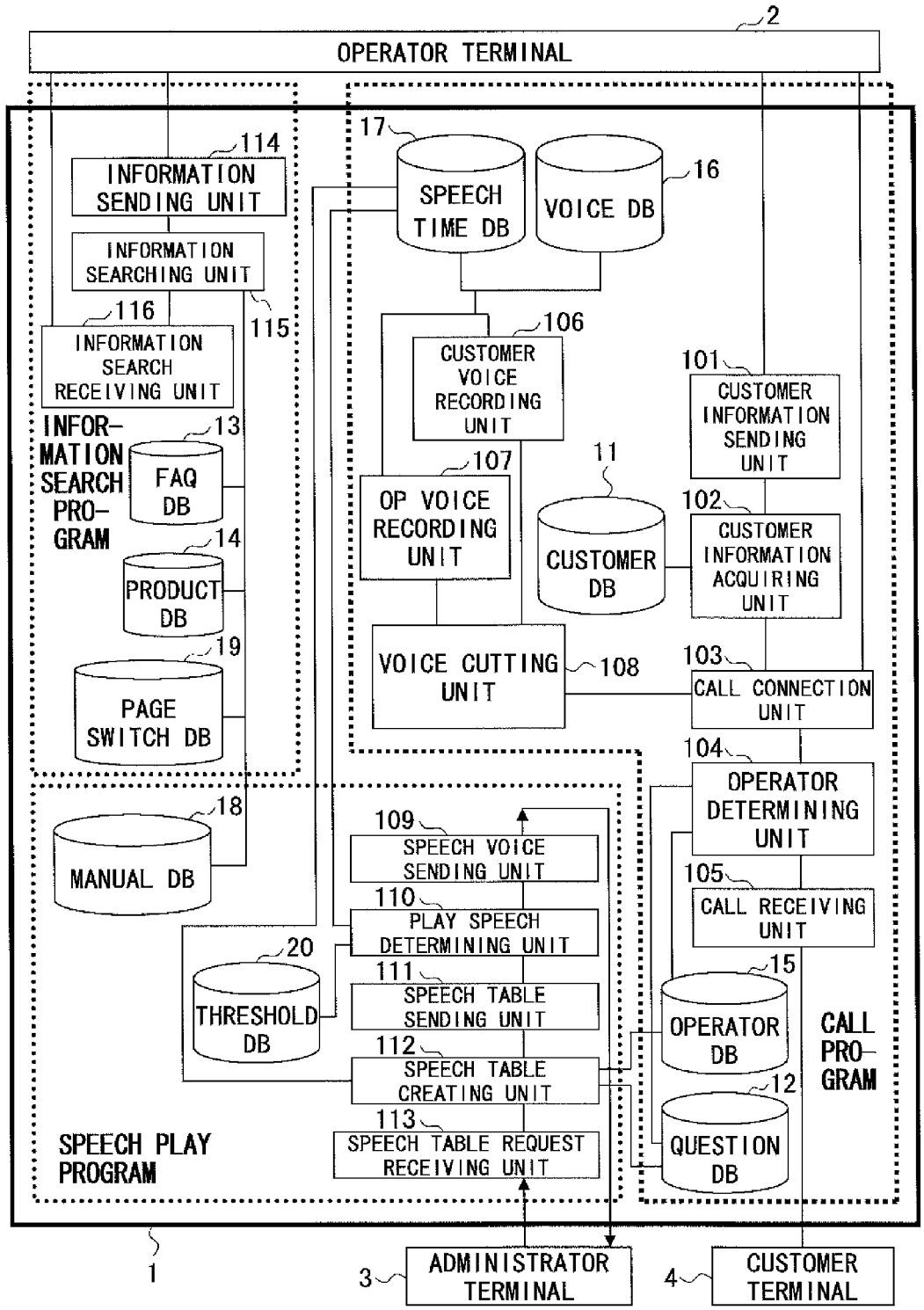
FIG. 4 is a function configuration diagram of the server.

FIG. 4 is a function configuration diagram of the server 1. The server 1 includes a customer DB 11, a question DB 12, a FAQ DB 13, a product DB 14, an operator DB 15, a voice DB 16, a speech time DB 17, a manual DB 18, a page switch DB 19, and a threshold DB 20.

By executing the call program 21, the server 1 realizes a customer information sending unit 101, a customer information acquiring unit 102, a call connection unit 103, an operator determining unit 104, a call receiving unit 105, a customer voice recording unit 106, an OP voice recording unit 107, and a voice cutting unit 108. Furthermore, by executing the speech play program 22, the server 1 realizes a speech voice sending unit 109, a play speech determining unit 110, a speech table sending unit 111, a speech table creating unit 112, and a speech table request receiving unit 113. Furthermore, by executing the information search program 23, the server realizes an information sending unit 114, an information searching unit 115, and an information search receiving unit 116.

The customer information sending unit 101 sends information of the customer to the operator terminal 2. The customer information acquiring unit 102 acquires information of the customer from the customer DB 11. The call connection unit 103 connects the operator terminal 2 with the customer terminal 4. The operator determining unit 104 determines an operator who is not attending to a call from the operator DB 15. The call receiving unit 105 receives a call from the customer terminal 4.

The customer voice recording unit 106 writes the voice data of the customer in a voice file. The customer voice recording unit 106 writes the speech start time and the speech end time of the customer in the speech time DB 17. The OP voice recording unit 107 writes the voice data of the operator in the voice file. The OP voice recording unit 107 writes the speech start time and the speech end time of the operator in the speech time DB 17.

The voice cutting unit 108 separates the voice data of the customer from the voice data of the operator. For example, the voice cutting unit 108 cuts the right channel of the voice data as voice data of the customer, and cuts the left channel of the voice data as voice data of the operator.

The speech voice sending unit 109 sends a voice file to the administrator terminal 3. The play speech determining unit 110 determines the speech to be played, and notifies the speech to the administrator terminal 3. The speech table sending unit 111 sends a speech table to the administrator terminal 3. The speech table creating unit 112 creates a speech table. The speech table request receiving unit 113 receives a speech table display request from the administrator terminal 3.

The information sending unit 114 sends the information searched from the FAQ DB 13, the product DB 14, and the manual DB 18, to the operator terminal 2. The information searching unit 115 searches for information in the FAQ DB 13, the product DB 14, and the manual DB 18. The information search receiving unit 116 receives a request to search for information from the operator terminal 2.

FIG. 5 is a configuration diagram of the customer DB 11. The customer DB 11 includes data items such as a customer ID, a telephone number, a customer, an address, a purchased product model number, and a purchased store.

The data item "customer ID" is identification information for uniquely identifying a customer. The data item "telephone number" is the customer's telephone number. The data item "customer" is the name of the customer. The data item "address" is the address of the customer. The data item "purchased product model number" is the model number of the product purchased by the customer. The data item "purchased store" is the store at which the customer purchased the product.

FIG. 6 is a configuration diagram of the question DB 12. The question DB 12 includes data items such as a call ID, an inquiry date, an inquiry time, an inquiry customer, and an operator ID.

The data item "call ID" is identification information for uniquely identifying a call. The data item "inquiry date" is the date on which the call from the customer is received. The data item "inquiry time" is the time at which a call from a customer is received. The data item "inquiry customer" is the customer ID of the customer that has made the inquiry. The data item "operator ID" is the operator ID of the operator who attended to the inquiry from the customer.

FIG. 7 is a configuration diagram of the FAQ DB 13. The FAQ DB 13 includes data items such as a product category, series, question genre, and answer. The FAQ DB 13 records a text of an answer for each of the product category, the series, and the question genre of a product.

FIG. 8 is a configuration diagram of the product DB 14. The product DB 14 includes data items such as a product category, series, a release year, and manual data. The product DB 14 records manual data for the product category, series, and the release year of the product. The manual data is a file name for uniquely identifying an image file in a pdf format.

FIG. 9 is a configuration diagram of the operator DB 15. The operator DB 15 includes data items such as an operator ID, an operator name, and a status. The operator DB 15 records the status of "attending to a call" or "available" for each operator. The data item "status" is information indicating whether the operator is able to attend to an inquiry from the customer.

FIG. 10 is a configuration diagram of the voice DB 16. The voice DB 16 includes data items such as a call ID, a voice file name, a left channel speaker, and a right channel speaker. The voice DB 16 records, for each call ID, the voice file name, a left channel speaker, and a right channel speaker.

The data item "voice file name" is the file name of a voice file recording the call corresponding to the call ID. The data item "left channel speaker" is the speaker of the voice data written in the left channel. The data item "right channel speaker" is the speaker of the voice data written in the right channel.

FIG. 11 is a configuration diagram of the speech time DB 17. The speech time DB 17 includes data items such as a call ID, a time, and contents. The speech time DB 17 records the speech start time of the operator, the speech end time of the operator, the speech start time of the customer, and the speech end time of the customer, in association with a call ID.

FIG. 12 is a configuration diagram of the manual DB 18. The manual DB 18 includes data items such as a manual name, a page, and screen data. The data item "manual name" is the name of the manual. The data item "page" is the page of the manual. The data item "screen data" is the screen data of the page of the manual. The screen data is preferably in a data format in which text search is possible (pdf format, etc.).

FIG. 13 is a configuration diagram of the page switch DB 19. The page switch DB 19 includes data items such as a time, a call ID, a summary, a page, and an operation. The page switch DB 19 records the operation of displaying and hiding information expressed by the summary and the page, in association with a call ID and a time.

Figure 14:
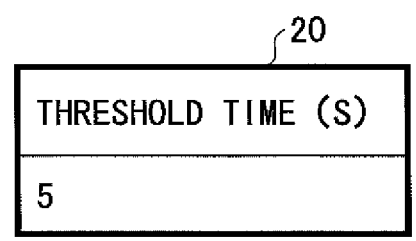
FIG. 14 is a configuration diagram of the threshold DB.

FIG. 14 is a configuration diagram of the threshold DB 20. The threshold DB 20 includes a data item of a threshold time. The threshold DB 20 records a threshold used in a process described below.

Figure 15:
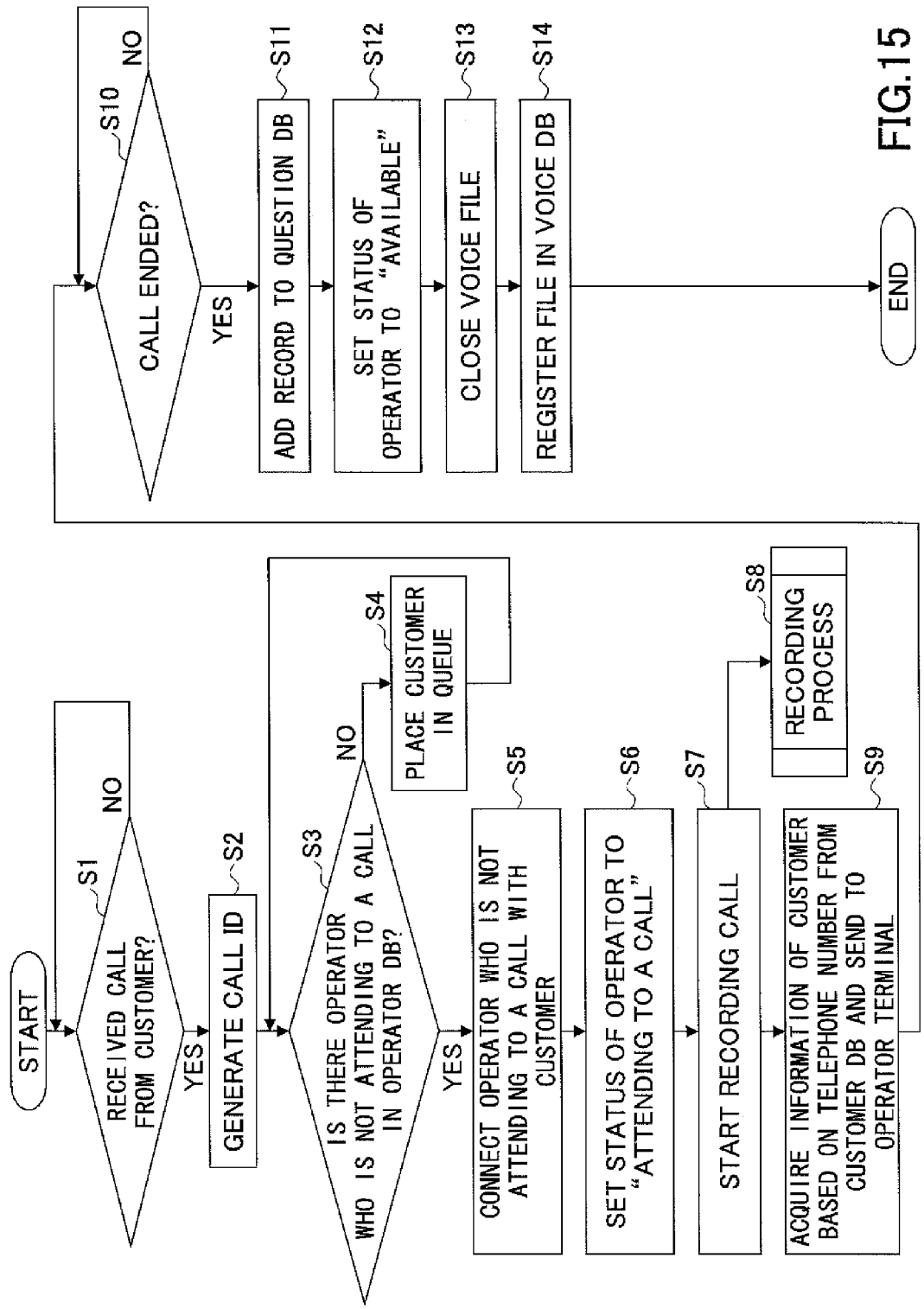
FIG. 15 is a flowchart of a process according to a call program.

FIG. 15 is a flowchart of a process according to the call program 21. In step S1, the call receiving unit 105 of the server 1 waits until a call is received from the customer terminal 4. When a call is received from the customer terminal 4, the call receiving unit 105 generates a call ID in step S2.

In step S3, the operator determining unit 104 refers to the operator DB 15, and determines whether there is an operator whose "status" data item is not "attending to a call" (available). When there is no operator who is not "attending to a call", in step S4, the operator determining unit 104 places the customer from which a call is received in a queue.

Then, the operator determining unit 104 waits until it is determined that there is an operator who is not "attending to a call". When the operator determining unit 104 determines that there is a operator who is not "attending to a call", the call connection unit 103 selects one operator who is not "attending to a call", and connects the operator terminal 2 of the selected operator with the customer terminal 4 (step S5).

In step S6, the operator determining unit 104 sets the "status" data item of the selected operator in the operator DB 15 to "attending to a call". Then, in step S7, the call connection unit 103 starts to record the call. The recording process of step S8 is executed after the recording of the call is started.

When the recording of the call is started, in step S9, the customer information acquiring unit 102 acquires information of the customer based on the telephone number of the call from the customer DB 11. The customer information sending unit 101 sends the information of the customer to the operator terminal 2.

In step S10, the operator determining unit 104 waits until the call ends. When the call ends, in step S11, the operator determining unit 104 adds a record relevant to the ended call to the question DB 12. In step S12, the operator determining unit 104 sets the data item "status" of the operator whose call has ended in the operator DB 15 as available. In step S13, the call connection unit 103 closes the voice file. In step S14, the call connection unit 103 registers, in the voice DB 16, a record relevant to the voice file of the ended call.

Figure 16:
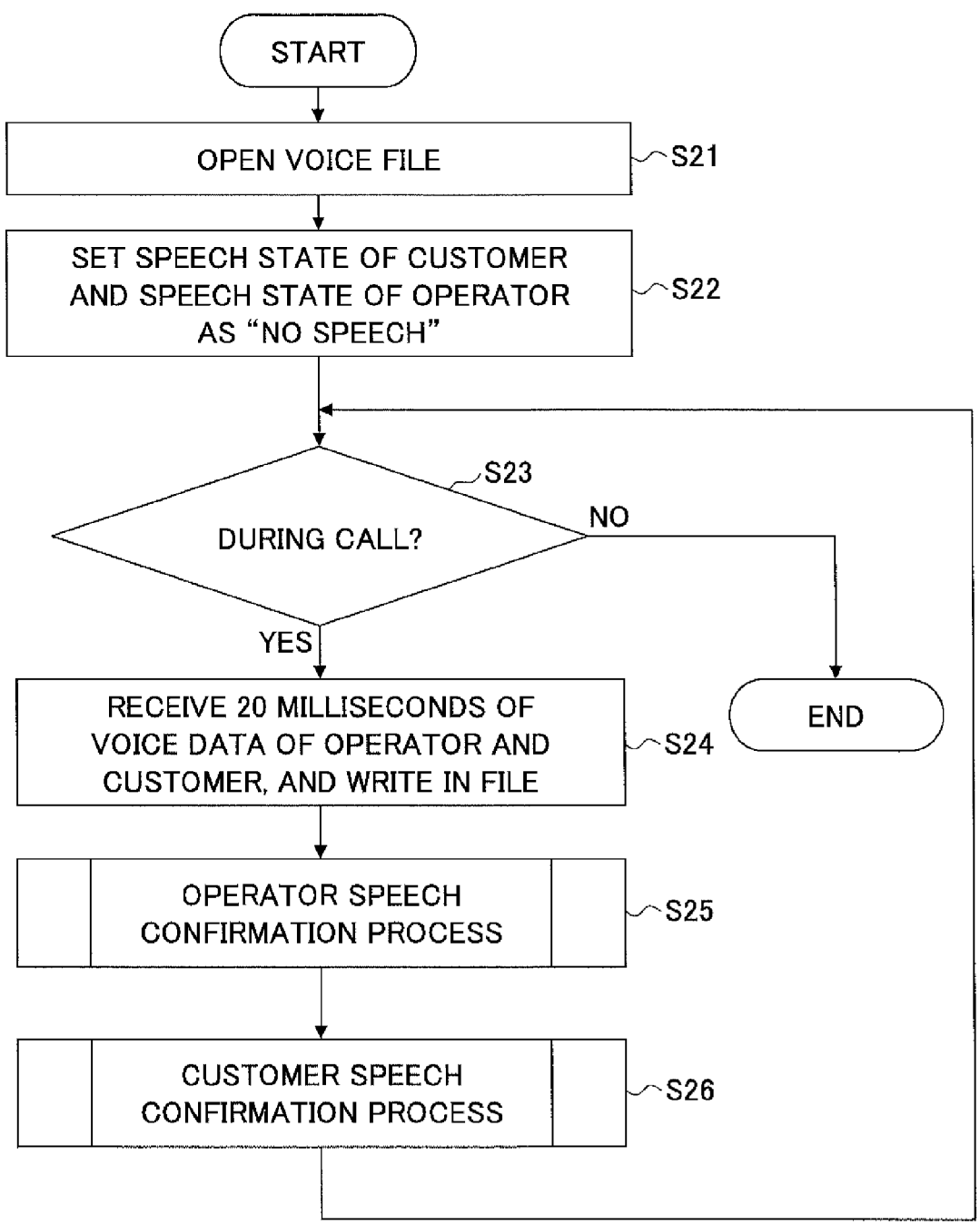
FIG. 16 is a flowchart of a recording process.

FIG. 16 is a flowchart of a recording process. In step S21, the call connection unit 103 opens a voice file. In step S22, the customer voice recording unit 106 sets the speech state of the customer as "no speech". The OP voice recording unit 107 sets the speech state of the operator as "no speech". In step S23, it is determined whether the call has ended, and the customer voice recording unit 106 and the OP voice recording unit 107 repeat steps S24 through S26 until the call ends.

In step S24, the customer voice recording unit 106 receives 20 milliseconds of the voice data of a customer among the voice data of the customer that has been cut by the voice cutting unit 108, and writes the received voice data in the voice file. The OP voice recording unit 107 receives 20 milliseconds of the voice data of an operator among the voice data of the operator that has been cut by the voice cutting unit 108, and writes the received voice data in the voice file.

In step S25, the customer voice recording unit 106 performs an operator speech confirmation process described below, confirms the speech start time and the speech end time of the operator, and writes the speech start time and the speech end time in the speech time DB 17. Furthermore, in step S26, the customer voice recording unit 106 performs a customer speech confirmation process described below, confirms the speech start time and the speech end time of the customer, and writes the speech start time and the speech end time in the speech time DB 17.

Figure 17:
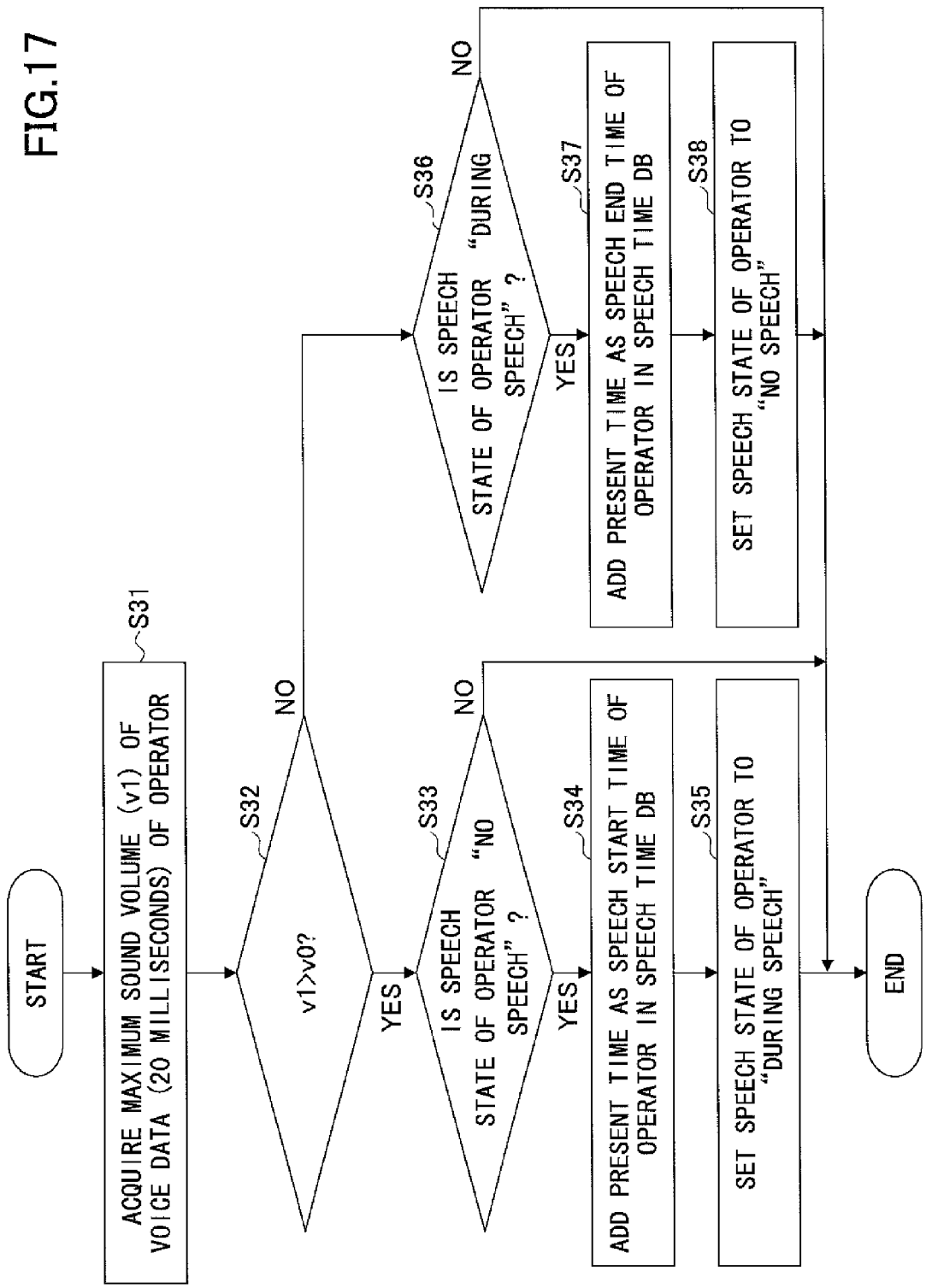
FIG. 17 is a flowchart of an operator speech confirmation process.

FIG. 17 is a flowchart of an operator speech confirmation process. In step S31, the OP voice recording unit 107 acquires the maximum sound volume (v1) of 20 milliseconds of the voice data of the operator.

In step S32, the OP voice recording unit 107 compares the maximum sound volume (v1) of the voice data of the operator with the sound volume (v0) determined as silent, and determines whether v1>v0 is satisfied.

When the OP voice recording unit 107 determines that v1>v0 is satisfied, the OP voice recording unit 107 determines whether the speech state of the operator is "no speech" in step S33. When the speech state of the operator is "no speech", in step S34, the OP voice recording unit 107 records the present time as the speech start time of the operator, in the speech time DB 17.

In step S35, the OP voice recording unit 107 sets the speech state of the operator to "during speech", and then ends the operator speech confirmation process of FIG. 17. When the speech state of the operator is not "no speech" in step S33, the OP voice recording unit 107 ends the operator speech confirmation process of FIG. 17.

When the OP voice recording unit 107 determines that v1>v0 is not satisfied, in step S36, the OP voice recording unit 107 determines whether the speech state of the operator is "during speech". When the speech state of the operator is "during speech", in step S37, the OP voice recording unit 107 records the present time as the speech end time of the operator in the speech time DB 17.

In step S38, the OP voice recording unit 107 sets the speech state of the operator to "no speech", and then ends the operator speech confirmation process of FIG. 17. When the speech state of the operator is not "during speech" in step S36, the OP voice recording unit 107 ends the operator speech confirmation process of FIG. 17.

Figure 18:
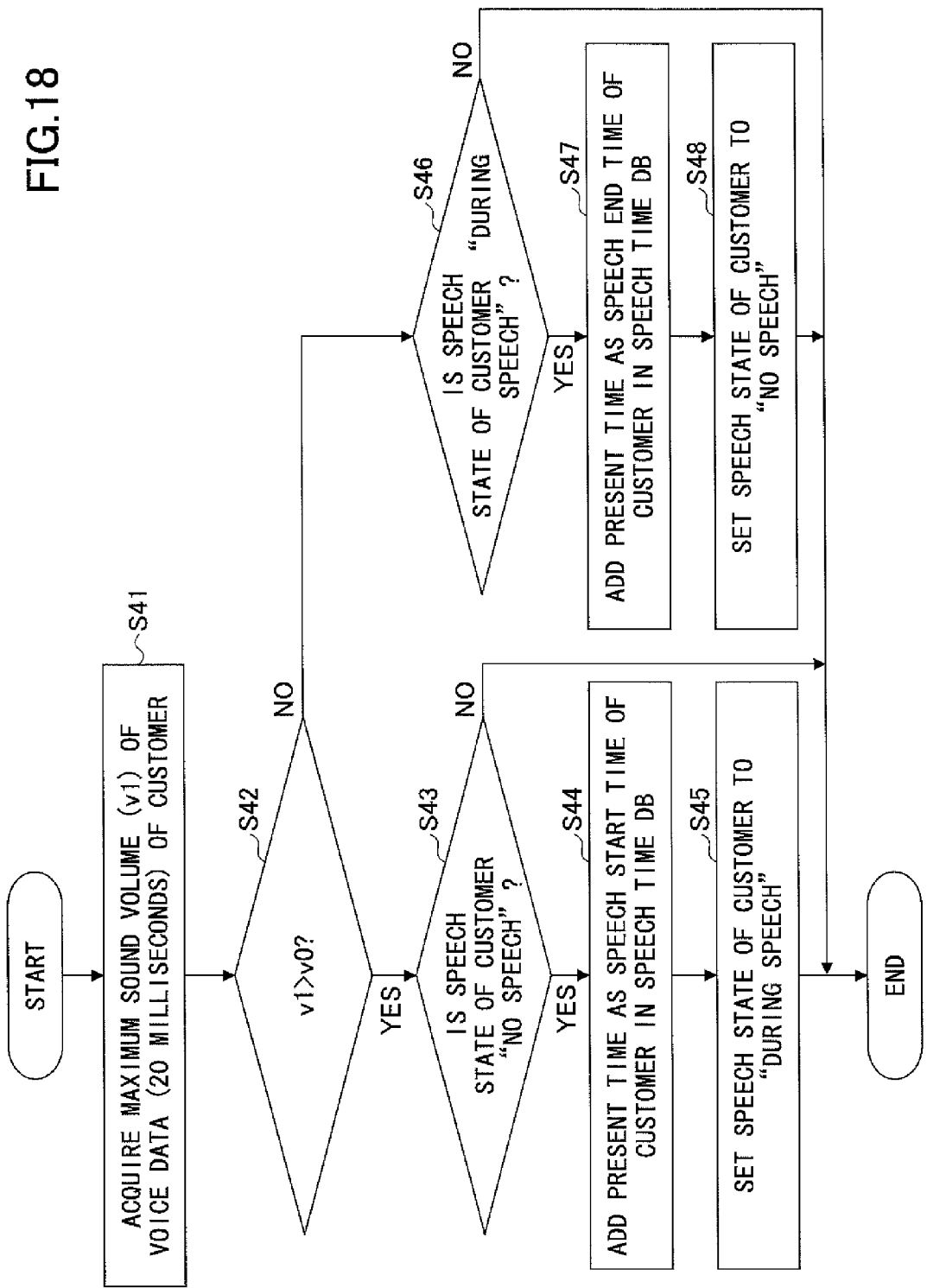
FIG. 18 is a flowchart of a customer speech confirmation process.

FIG. 18 is a flowchart of a customer speech confirmation process. In step S41, the customer voice recording unit 106 acquires the maximum sound volume (v1) of 20 milliseconds of the voice data of the customer.

In step S42, the customer voice recording unit 106 compares the maximum sound volume (v1) of the voice data of the customer with the sound volume (v0) determined as silent, and determines whether v1>v0 is satisfied.

When the customer voice recording unit 106 determines that v1>v0 is satisfied, in step S43, the customer voice recording unit 106 determines whether the speech state of the customer is "no speech". When the speech state of the customer is "no speech", in step S44, the customer voice recording unit 106 records the present time as the speech start time of the customer in the speech time DB 17.

In step S45, the customer voice recording unit 106 sets the speech state of the customer to "during speech", and then ends the customer speech confirmation process of FIG. 18. When the speech state of the customer is not "no speech" in step S43, the customer voice recording unit 106 ends the customer speech confirmation process of FIG. 18.

When the customer voice recording unit 106 determines that v1>v0 is not satisfied, in step S46, the customer voice recording unit 106 determines whether the speech state of the customer is "during speech". When the speech state of the customer is "during speech", in step S47, the customer voice recording unit 106 records the present time as the speech end time of the customer in the speech time DB 17.

In step S48, the customer voice recording unit 106 sets the speech state of the customer to "no speech", and then ends the customer speech confirmation process of FIG. 18. When the speech state of the customer is not "during speech" in step S46, the customer voice recording unit 106 ends the customer speech confirmation process of FIG. 18.

Figure 19:
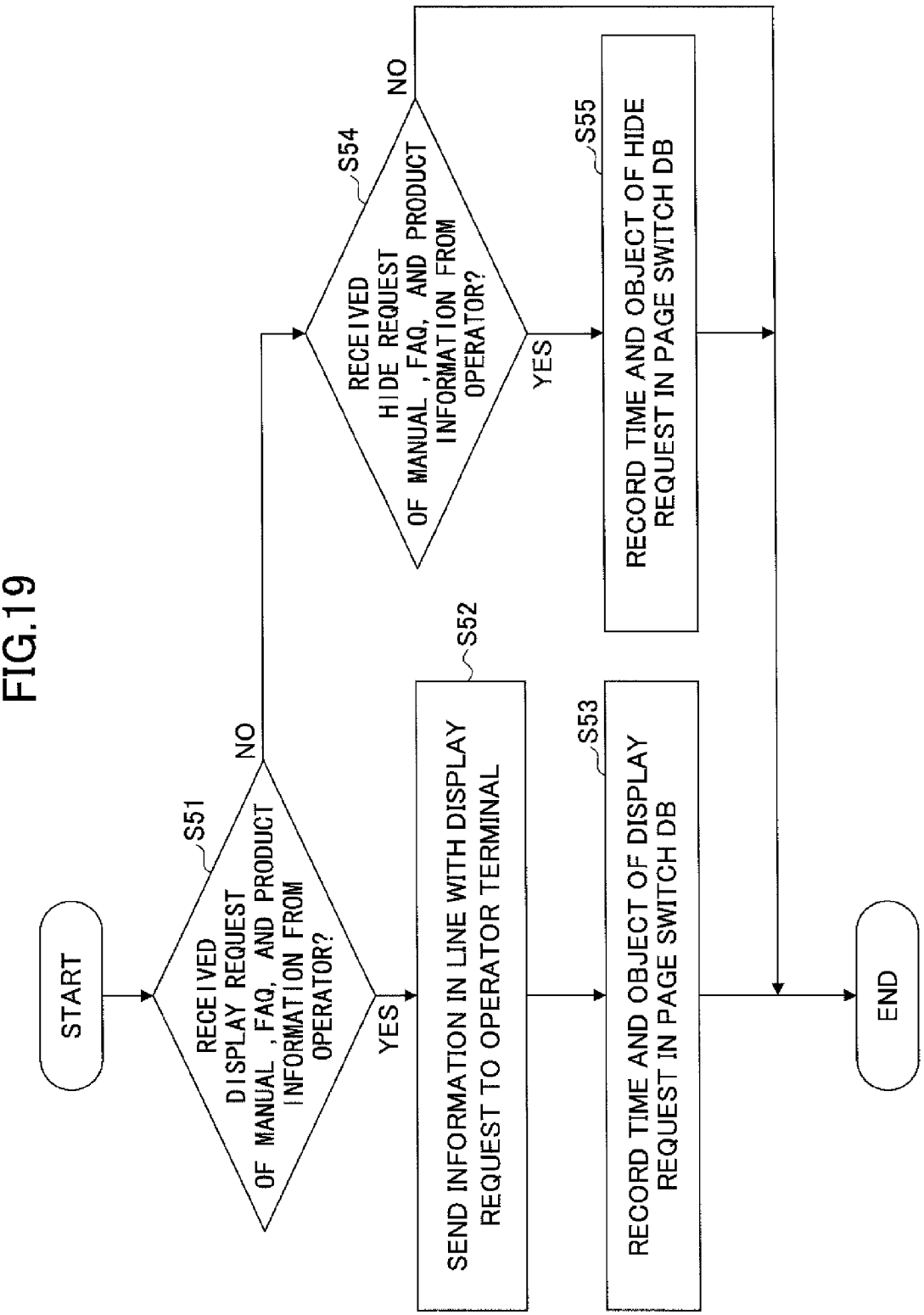
FIG. 19 is a flowchart of a process according to an information search program.

FIG. 19 is a flowchart of a process according to the information search program 23. In step S51, the information search receiving unit 116 determines whether a request to display a manual, FAQ, and product information is received from the operator terminal 2.

When a display request is received, in step S52, the information searching unit 115 searches for information in line with the display request. For example, when the display request for a manual is received, the information searching unit 115 searches for information in line with the display request, in the manual DB 18. The information sending unit 114 sends the information in line with the display request to the operator terminal 2.

In step S53, the information searching unit 115 records, in the page switch DB 19, a record of information in line with the display request sent to the operator terminal 2, and then ends the process of the flowchart of FIG. 19. The record of the information in line with the display request includes the time when the display request is made and the object for which the display request is made. In the page switch DB 19 of FIG. 13, the object for which the display request is made is expressed by the summary and the page.

Meanwhile, when the display request is not received, in step S54, the information searching unit 115 determines whether a hide request for hiding the manual, FAQ, and product information is received from the operator terminal 2. When a hide request is received, in step S55, the information searching unit 115 records, in the page switch DB 19, a record of information in line with the hide request, and then ends the process of the flowchart of FIG. 19.

The record of the information in line with the hide request includes the time when the hide request is made and the object for which the hide request is made. In the page switch DB 19 of FIG. 13, the object for which the hide request is made is expressed by the summary and the page. When the information searching unit 115 does not receive the hide request, the process of the flowchart of FIG. 19 is ended.

Figure 20:
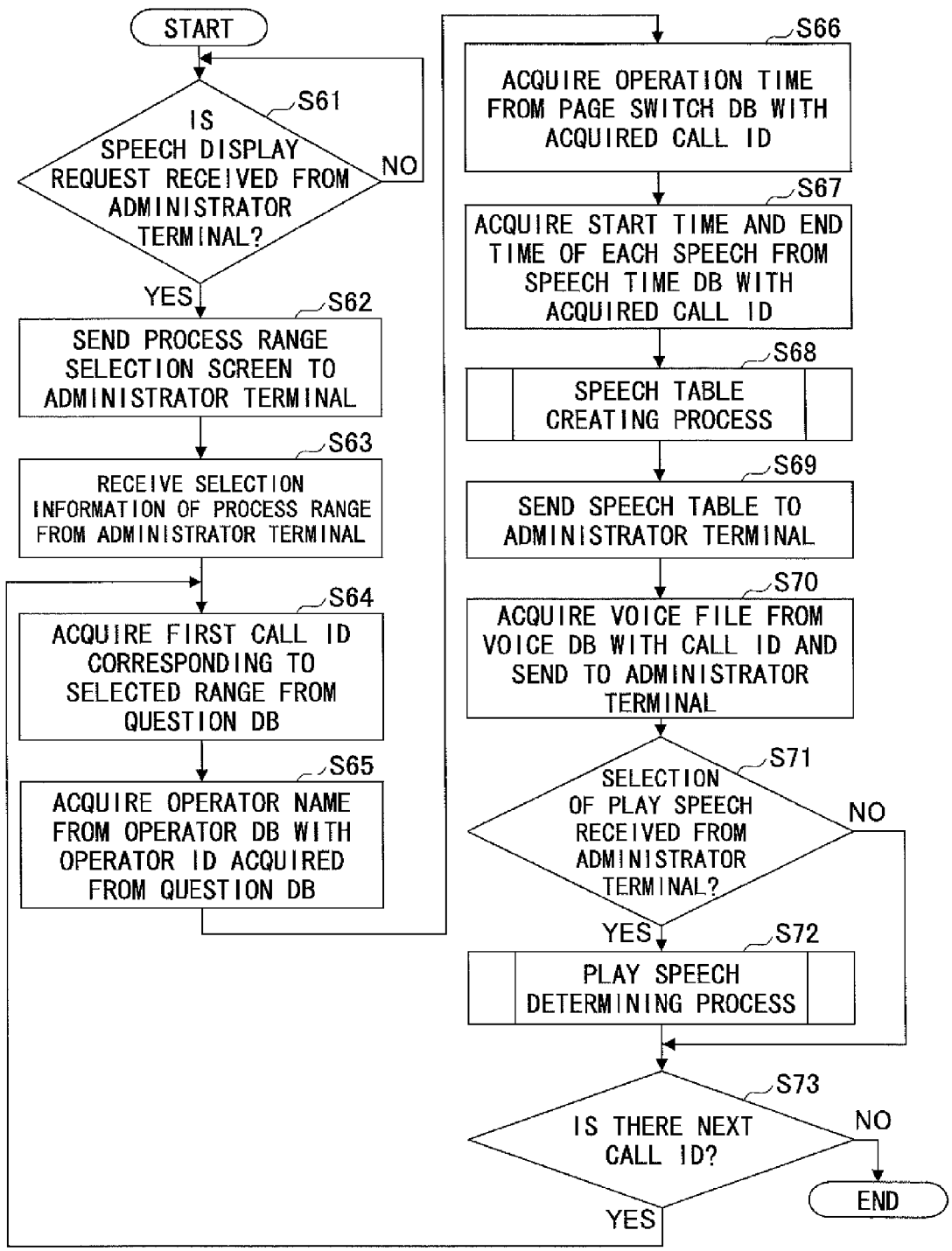
FIG. 20 is a flowchart of a process according to the speech play program.

FIG. 20 is a flowchart of a process according to the speech play program 22. In step S61, the speech table request receiving unit 113 waits until a speech table display request is received from the administrator terminal 3. When a speech table display request is received from the administrator terminal 3, in step S62, the speech table request receiving unit 113 sends a process range selection screen described below to the administrator terminal 3.

The administrator terminal 3 that has received the process range selection screen displays the process range selection screen described below and prompts the administrator to input selection information of the process range. The administrator terminal 3 sends the selection information of the process range input by the administrator, to the server 1. In step S63, the speech table request receiving unit 113 receives the selection information of the process range from the administrator terminal 3.

In step S64, the speech table creating unit 112 acquires, from the question DB 12, a record of the first call ID corresponding to the selection information of the process range received from the administrator terminal 3.

In step S65, the speech table creating unit 112 uses the operator ID included in the record acquired from the question DB 12 to acquire an operator name from the operator DB 15.

In step S66, the question DB 12 uses the call ID included in the record acquired from the question DB 12, to acquire the time (operation time) when the display request or the hide request is made, from the page switch DB 19.

In step S67, the speech table creating unit 112 uses the call ID included in the record acquired from the question DB 12, to acquire the start time and the end time of each speech, from the speech time DB 17.

In step S68, the speech table creating unit 112 performs the speech table creating process described below. In step S69, the speech table sending unit 111 sends the speech table to the administrator terminal 3 from which the speech table display request is received.

In step S70, the speech voice sending unit 109 uses the call ID included in the record acquired from the question DB 12 to acquire the voice file name from the voice DB 16, and sends the voice file of the voice file name to the administrator terminal 3.

In step S71, the play speech determining unit 110 determines whether a selection of a speech to be played is received from the administrator terminal 3. When a selection of a speech to be played is received from the administrator terminal 3, the play speech determining unit 110 performs the play speech determining process described below, in step S72. When a selection of a speech to be played is not received from the administrator terminal 3, the play speech determining unit 110 does not perform the play speech determining process described below.

In step S73, the speech table creating unit 112 determines whether there is a record of a next call ID corresponding to the selection information of the process range received from the administrator terminal 3, in the question DB 12.

When there is a record of the next call ID, in step S64, the speech table creating unit 112 acquires the record of the next call ID from the question DB 12, and then performs the process of step S65 and onward. When there is no record of a next call ID, the speech table creating unit 112 ends the process of the flowchart of FIG. 20.

FIG. 21 is an image diagram of a process range selection screen 200. The process range selection screen 200 is used by the administrator for inputting selection information of the process range. The process range selection screen 200 prompts the administrator to specify a call ID or to specify a condition (date range or operator ID), as the selection information of the process range.

Figure 22:
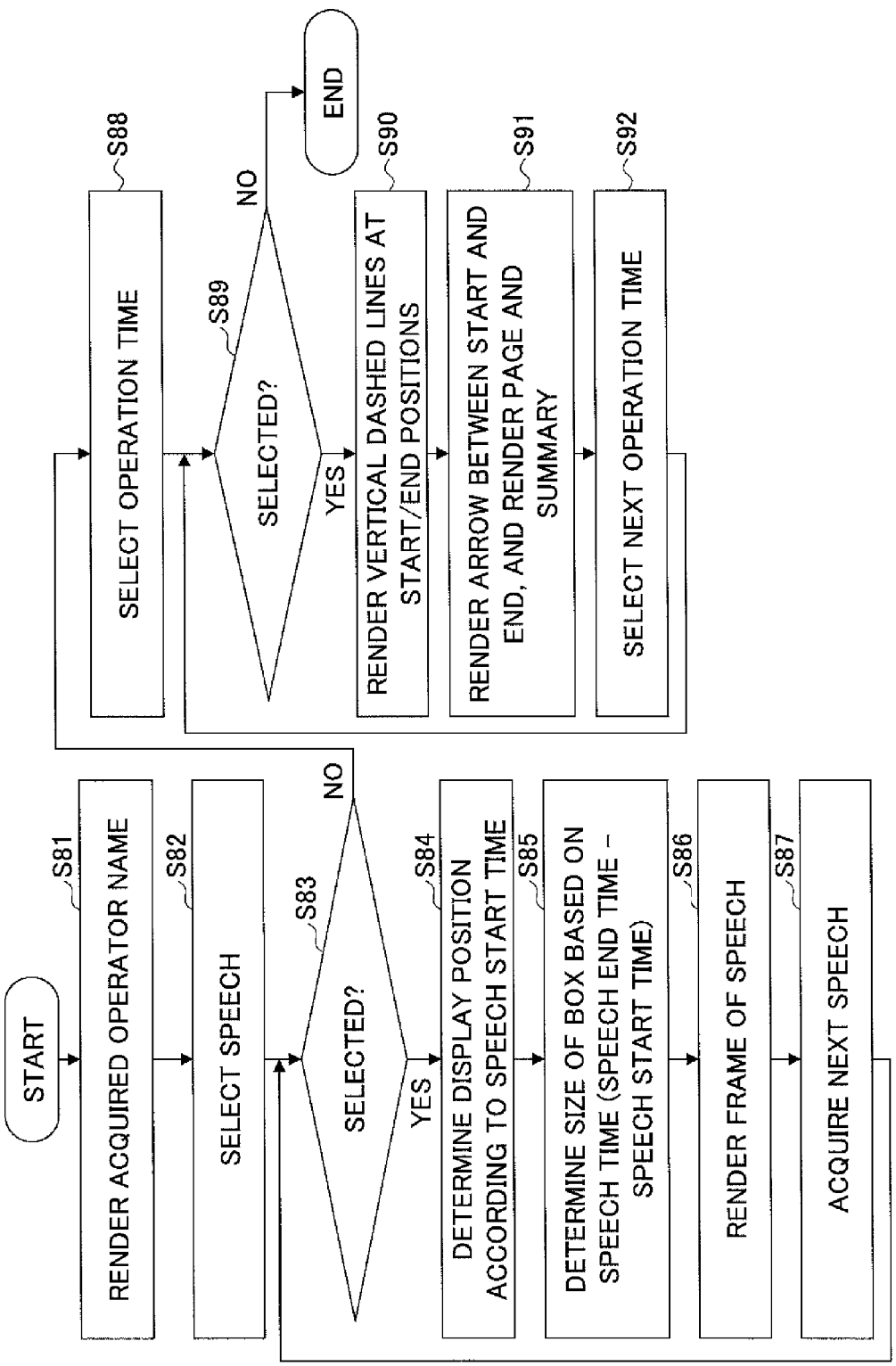
FIG. 22 is a flowchart of a speech table creating process.

FIG. 22 is a flowchart of a speech table creating process. In step S81, the speech table creating unit 112 renders the operator name acquired in step S65 in the speech table. In step S82, the speech table creating unit 112 selects one speech for which a start time and an end time are acquired in step S67.

In step S83, the speech table creating unit 112 determines whether a speech has been selected, and repeats steps S84 through S87 until the speech table creating unit 112 determines that it is not possible to select a speech for which a start time and an end time are acquired in step S67. When one speech for which a start time and an end time are acquired in step S67 is selected, in step S84, the speech table creating unit 112 determines the display position according to the start time of the speech.

In step S85, the speech table creating unit 112 determines the size of a box (frame of speech) indicating a speech in the speech table, based on the time of speech (end time of speech−start time of speech). In step S86, the speech table creating unit 112 renders the frame of the speech in the speech table. In step S87, the speech table creating unit 112 selects the next speech for which a start time and an end time are acquired in step S67.

In step S83, when the speech table creating unit 112 determines that one speech for which a start time and an end time are acquired is not selected, the speech table creating unit 112 performs the process of step S88. In step S88, the speech table creating unit 112 selects one operation time acquired at step S66.

When the operation time is selected, in step S90, the speech table creating unit 112 renders vertical dashed lines at the position of the time (display start time) when the display request is made and at the position of the time (display end time) when the hide request is made.

In step S91, the speech table creating unit 112 renders an arrow between the vertical dashed lines rendered at step S90, and renders the page and the summary. In step S92, the speech table creating unit 112 selects the next operation time acquired at step S66. In step S89, the speech table creating unit 112 determines whether a next operation time has been selected, and repeats steps S90 through S92 until the speech table creating unit 112 determines that it is not possible to select a next operation time. In step S89, when the speech table creating unit 112 determines that it is not possible to select a next operation time, the speech table creating unit 112 ends the process of the flowchart of FIG. 22.

Figure 23:
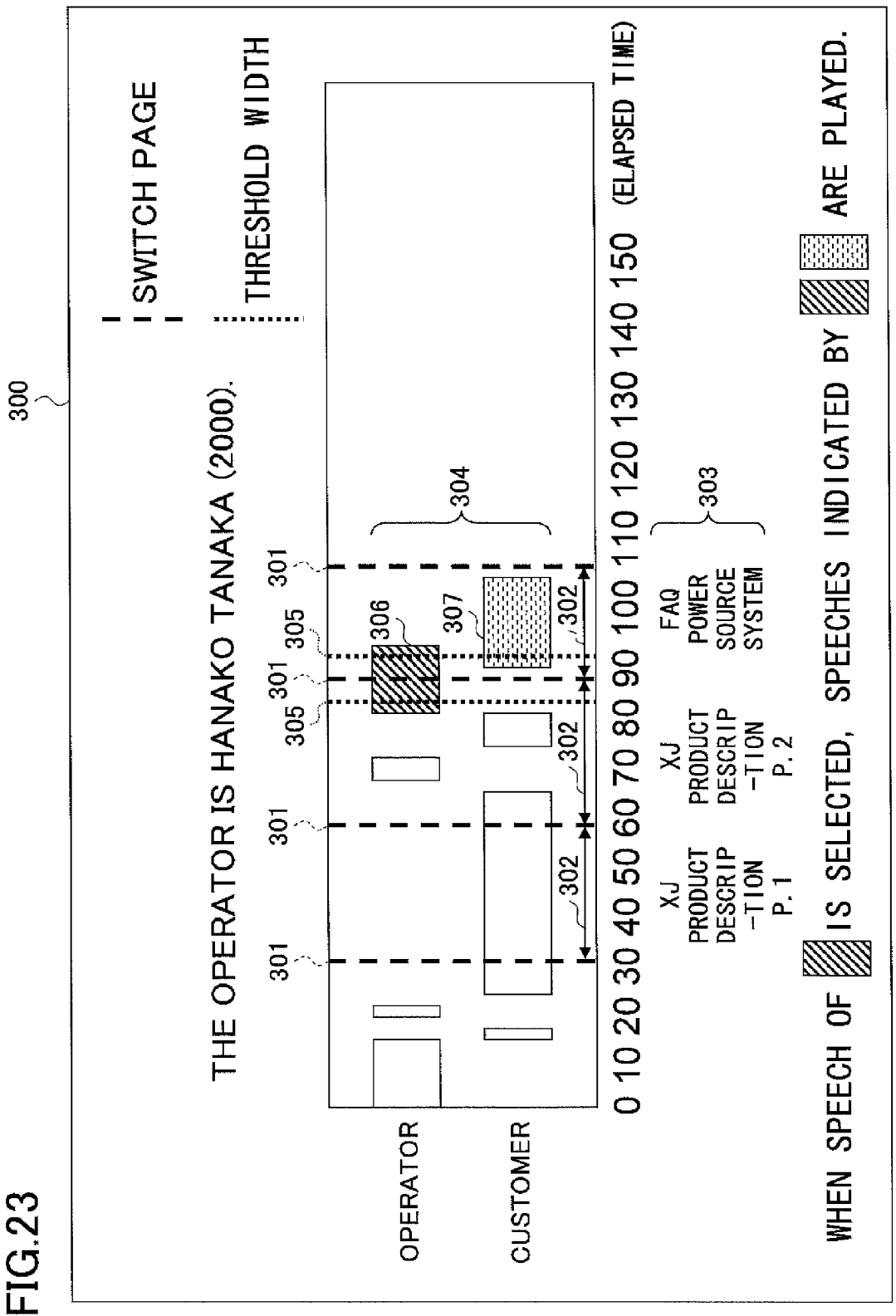
FIG. 23 is a screen image diagram of a speech table.

FIG. 23 is a screen image diagram of a speech table 300. In the speech table 300 of FIG. 23, an operator name, vertical dashed lines 301 indicating the positions of the start time and the end time of display, arrows 302 rendered between the vertical dashed lines 301, pages and summaries 303, and frames 304 of speeches of the operator and the customer, are displayed.

For example, in the speech table 300, by clicking one of the frames 304 of speeches of the operator and the customer with a mouse, it is possible to play the speech selected as described below from the recorded speeches of the operator and the customer. Note that in the speech table 300 of FIG. 23, the elapsed time is expressed by a relative time instead of the actual time. The time may be easily switched between the actual time and the relative time.

In the speech table 300 of FIG. 23, the width of the threshold time used in the play speech determining process described below, is indicated by dashed vertical lines 305. The dashed vertical lines 305 do not have to be displayed. Furthermore, the speech table 300 of FIG. 23 expresses that when a frame of speech 306 is selected, speeches corresponding to the frame of speech 306 and a frame of speech 307 are selected and played by the play speech determining process described below.

In the speech table 300 of FIG. 23, the frame of speech 306 is selected, which is included in the range from the vertical lines 301 expressing the positions of the display start time and the display end time to the threshold time. Therefore, the frame of speech 307 is also selected, which is included in the same threshold time range as that of the frame of speech 306, and speeches corresponding to the frame of speech 306 and the frame of speech 307 are selected and played.

Figure 24:
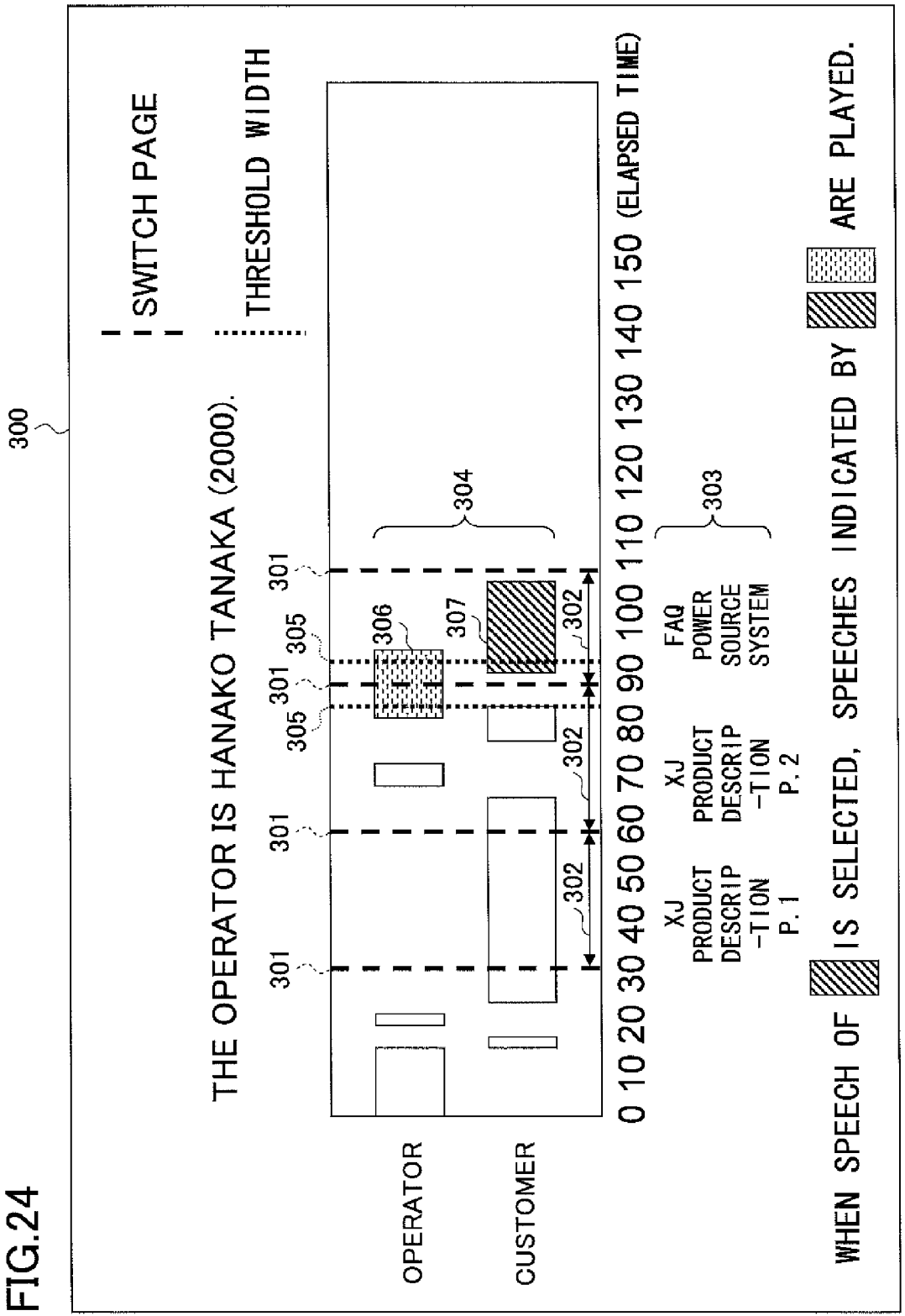
FIG. 24 is another example of a screen image diagram of a speech table.

FIG. 24 is a screen image diagram of another example of the speech table 300. The speech table 300 of FIG. 24 is an example where the frame of speech 307 is selected in the speech table 300 of FIG. 23. In the speech table 300 of FIG. 24, speeches corresponding to the frame of speech 306 and the frame of speech 307 are selected and played by the play speech determining process described below.

In the speech table 300 of FIG. 24, the frame of speech 307 is selected, which is included in the range from the vertical lines 301 expressing the positions of the display start time and the display end time to the threshold time. Therefore, the frame of speech 306 is also selected, which is included in the same threshold time range as that of the frame of speech 307, and speeches corresponding to the frame of speech 306 and the frame of speech 307 are selected and played.

Figure 25:
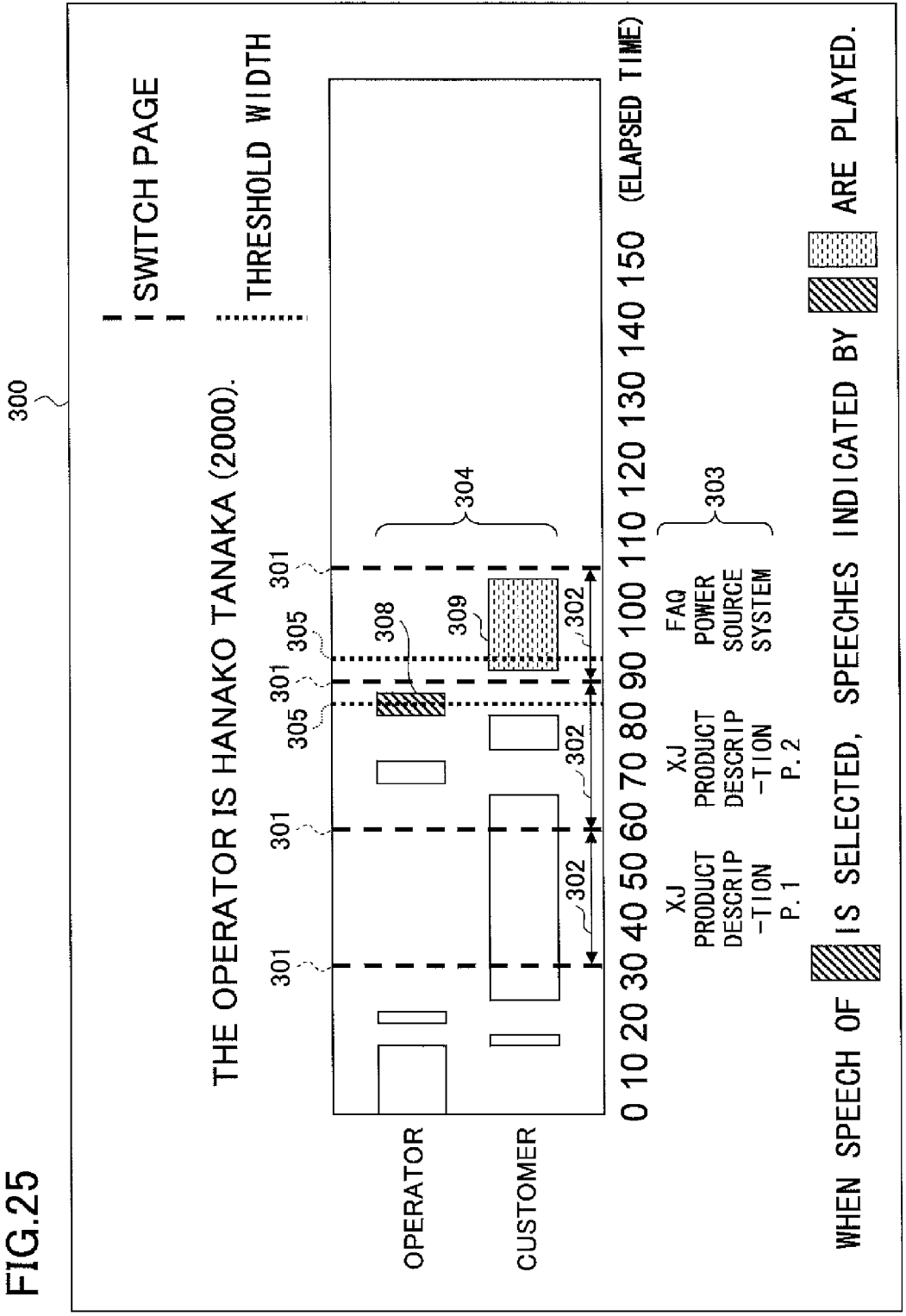
FIG. 25 is yet another example of a screen image diagram of a speech table.

FIG. 25 is a screen image diagram of another example of the speech table 300. Similar to the speech table 300 of FIG. 23, also in the speech table 300 of FIG. 25, an operator name, vertical dashed lines 301 indicating the positions of the start time and the end time of display, arrows 302 rendered between the vertical dashed lines 301, pages and summaries 303, and frames 304 of speeches of the operator and the customer, are displayed.

In the speech table 300 of FIG. 25, when a frame of speech 308 is selected, speeches corresponding to the frame of speech 308 and a frame of speech 309 are selected and played by the play speech determining process described below.

In the speech table 300 of FIG. 25, the frame of speech 308 is selected, which is included in the range from the vertical lines 301 expressing the positions of the display start time and the display end time to the threshold time. Therefore, the frame of speech 309 is also selected, which is included in the same threshold time range as that of the frame of speech 308, and speeches corresponding to the frame of speech 308 and the frame of speech 309 are selected and played.

Figure 26:
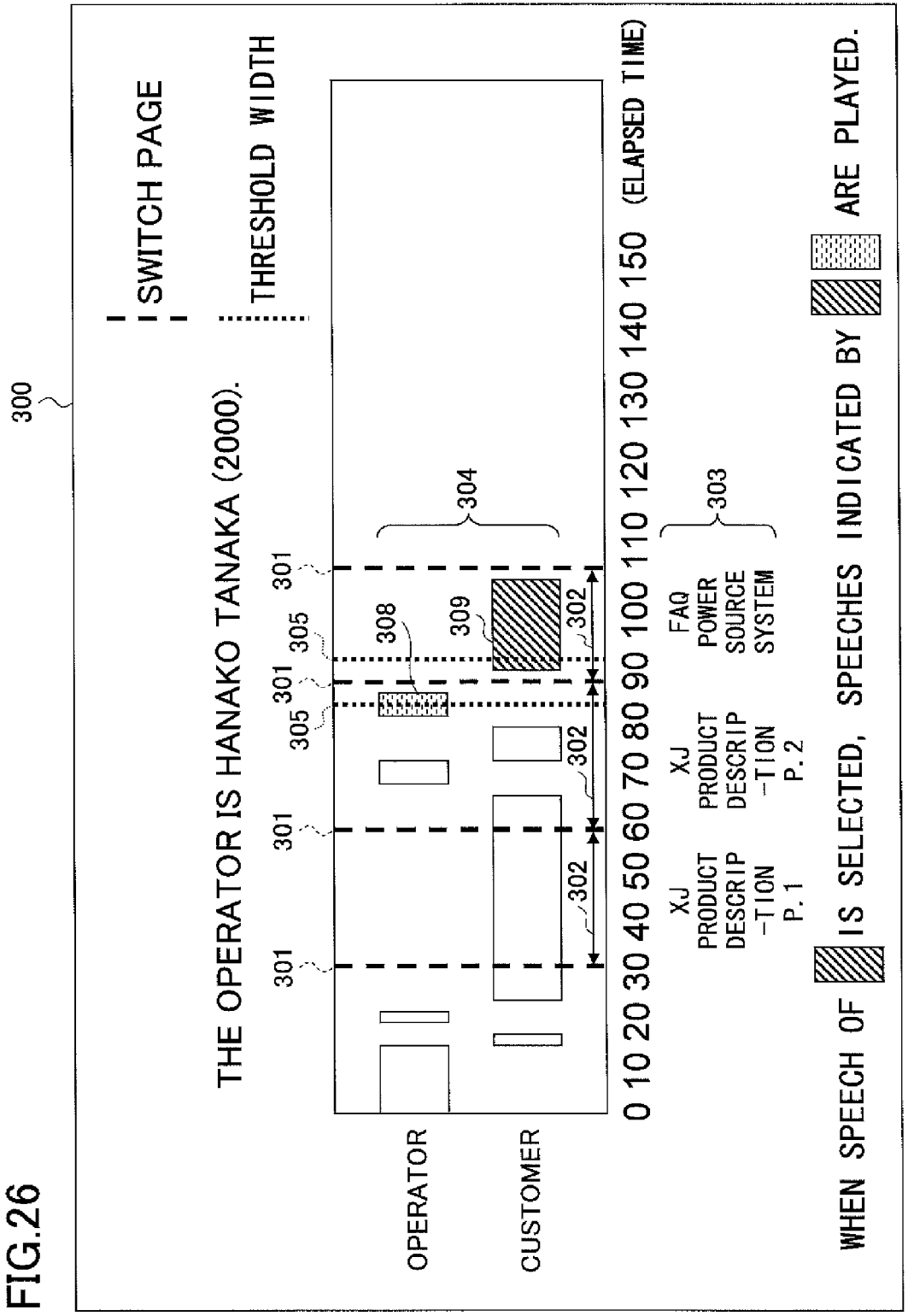
FIG. 26 is yet another example of a screen image diagram of a speech table.

FIG. 26 is a screen image diagram of another example of the speech table 300. The speech table 300 of FIG. 26 is an example where the frame of speech 309 is selected in the speech table 300 of FIG. 25. In the speech table 300 of FIG. 26, speeches corresponding to the frame of speech 308 and the frame of speech 309 are selected and played by the play speech determining process described below.

In the speech table 300 of FIG. 26, the frame of speech 309 is selected, which is included in the range from the vertical lines 301 expressing the positions of the display start time and the display end time to the threshold time. Therefore, the frame of speech 308 is also selected, which is included in the same threshold time range as that of the frame of speech 309, and speeches corresponding to the frame of speech 308 and the frame of speech 309 are selected and played.

By the speech table 300 of FIGS. 23 through 26, it is determined that the speeches of the operator and the customer included in the range from the page switch time to the threshold time are related to each other, and therefore even if either one of the speech of the operator or the speech of the customer is selected, both are played, which reduces the operations for selecting speeches.

Figure 27:
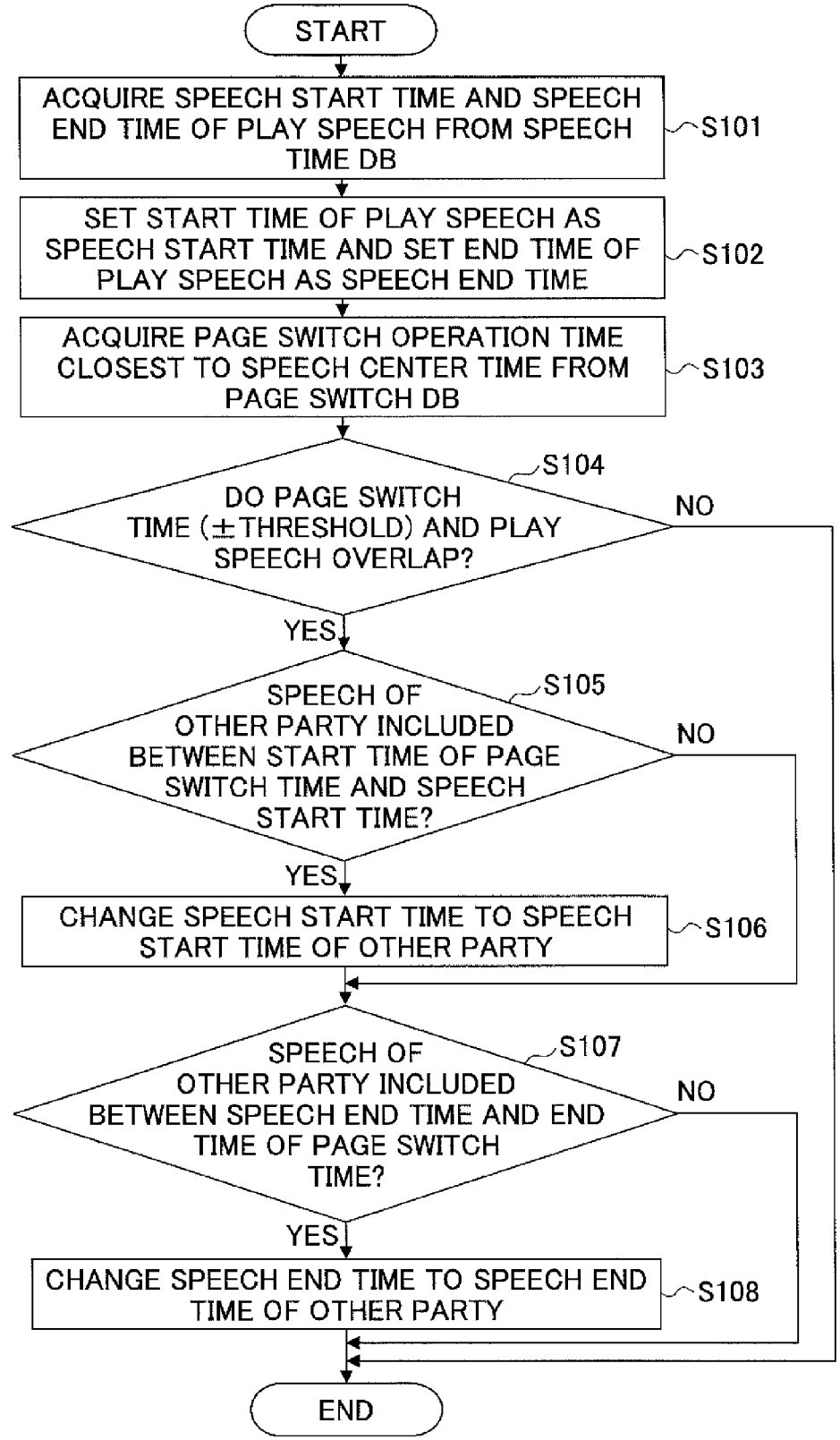
FIG. 27 is a flowchart of an example of a play speech determining process.

FIG. 27 is a flowchart of an example of a play speech determining process. In step S101, the play speech determining unit 110 acquires, from the speech time DB 17, the start time and the end time of a play speech selected by the administrator terminal 3.

In step S102, the play speech determining unit 110 sets the start time of the play speech as the speech start time, and sets the end time of the play speech as the speech end time. The play speech determining unit 110 obtains the speech center time from the following formula (I). The speech time is the time from the speech start time to the speech end time.

$$\text{Speech center time} = \text{Speech start time} + \frac{\text{Speech time}}{2} \qquad (1)$$

In step S103, the play speech determining unit 110 acquires the page switch operation time closest to the speech center time, from the page switch DB 19. In step S104, the play speech determining unit 110 determines whether the page switch time, which corresponds to the width between threshold times provided before and after the page switch operation time, and the play speech overlap each other.

When the page switch time and the play speech overlap each other, in step S105, the play speech determining unit 110 determines whether a speech of the other party is included between the start time of the page switch time and the speech start time. The other party is the operator when the play speech is the speech of a customer, and the other party is the customer when the play speech is the speech of an operator.

In the speech table 300 of FIGS. 24 and 26, it is determined that the speech of the other party is included between the start time of the page switch time and the speech start time, in step S105. When the speech of the other party is included between the start time of the page switch time and the speech start time, in step S106, the play speech determining unit 110 changes the speech start time to the start time of the speech of the other party included in the page switch time, and performs the process of step S107. When the speech of the other party is not included between the start time of the page switch time and the speech start time, the play speech determining unit 110 performs the process of step S107 without performing the process of step S106.

In step S107, the play speech determining unit 110 determines whether the speech of the other party is included between the speech end time and the end time of the page switch time.

In the speech table 300 of FIGS. 23 and 25, it is determined that the speech of the other party is included between the speech end time and the end time of the page switch time, in step S105. When the speech of the other party is included between the speech end time and the end time of the page switch time, in step S108, the play speech determining unit 110 changes the speech end time to the end time of the speech of the other party included in the page switch time, and then ends the process of the flowchart of FIG. 27.

When the speech of the other party is not included between the speech end time and the end time of the page switch time, the play speech determining unit 110 ends the process of the flowchart of FIG. 27, without performing the process of step S108. Furthermore, when the page switch time and the play speech do not overlap each other in step S104, the play speech determining unit 110 ends the process of the flowchart of FIG. 27.

Figure 28:
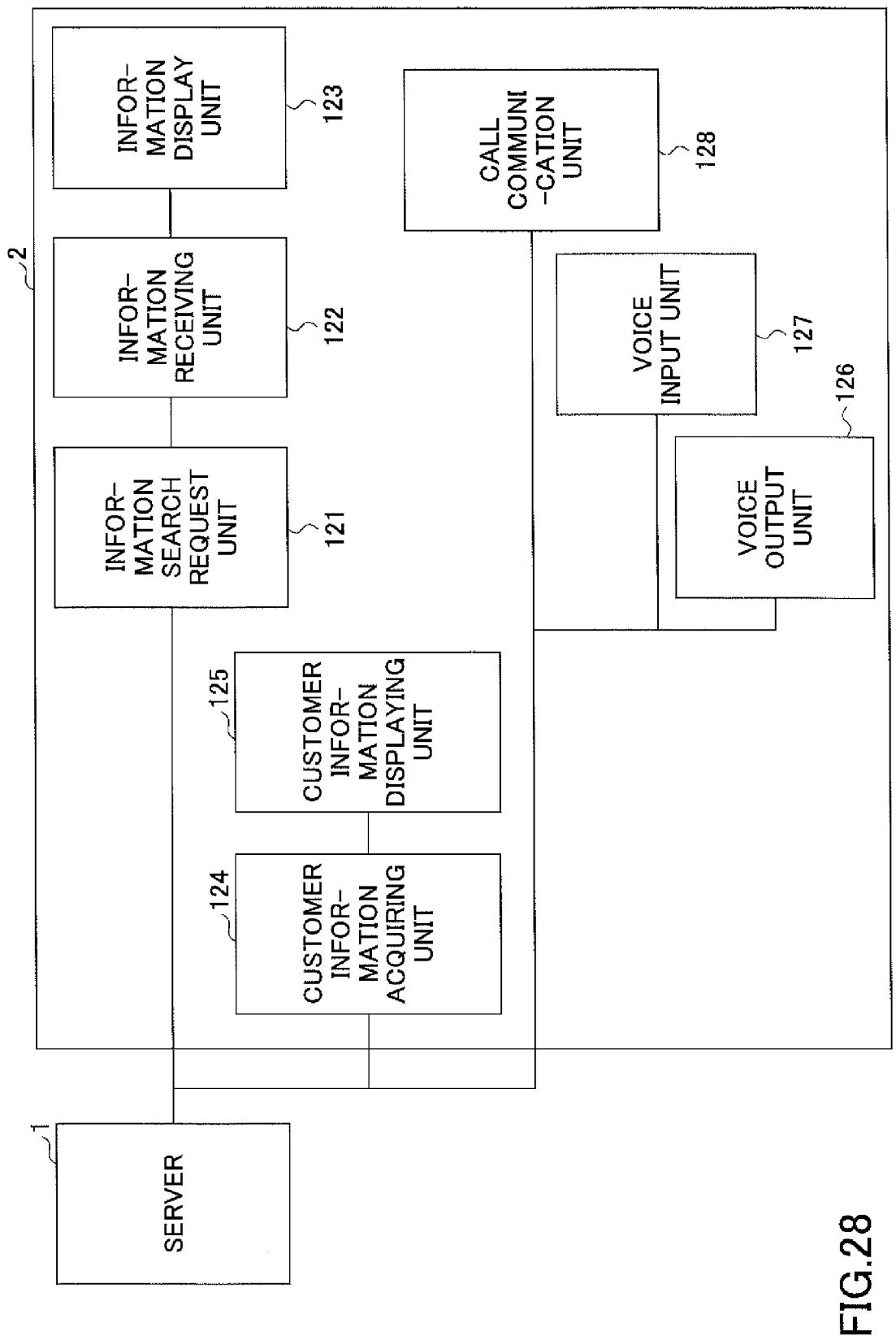
FIG. 28 is a function configuration diagram of the operator terminal.

FIG. 28 is a function configuration diagram of the operator terminal 2. The operator terminal 2 includes an information search request unit 121, an information receiving unit 122, an information display unit 123, a customer information acquiring unit 124, a customer information displaying unit 125, a voice output unit 126, a voice input unit 127, and a call communication unit 128.

By executing the operator program 31, the operator terminal 2 realizes the information search request unit 121, the information receiving unit 122, the information display unit 123, the customer information acquiring unit 124, the customer information displaying unit 125, the voice output unit 126, the voice input unit 127, and the call communication unit 128.

The information search request unit 121 makes a search request for information to the server 1. The information receiving unit 122 receives the search result of information from the server 1. The information display unit 123 displays the search result on the display device 71.

The customer information acquiring unit 124 receives information of the customer from the server 1. The customer information displaying unit 125 displays the information of the customer on the display device 71. The voice output unit 126 outputs a voice with the speaker 91. The voice input unit 127 inputs a voice from the microphone 92. The call communication unit 128 communicates with the customer terminal 4.

Figure 29:
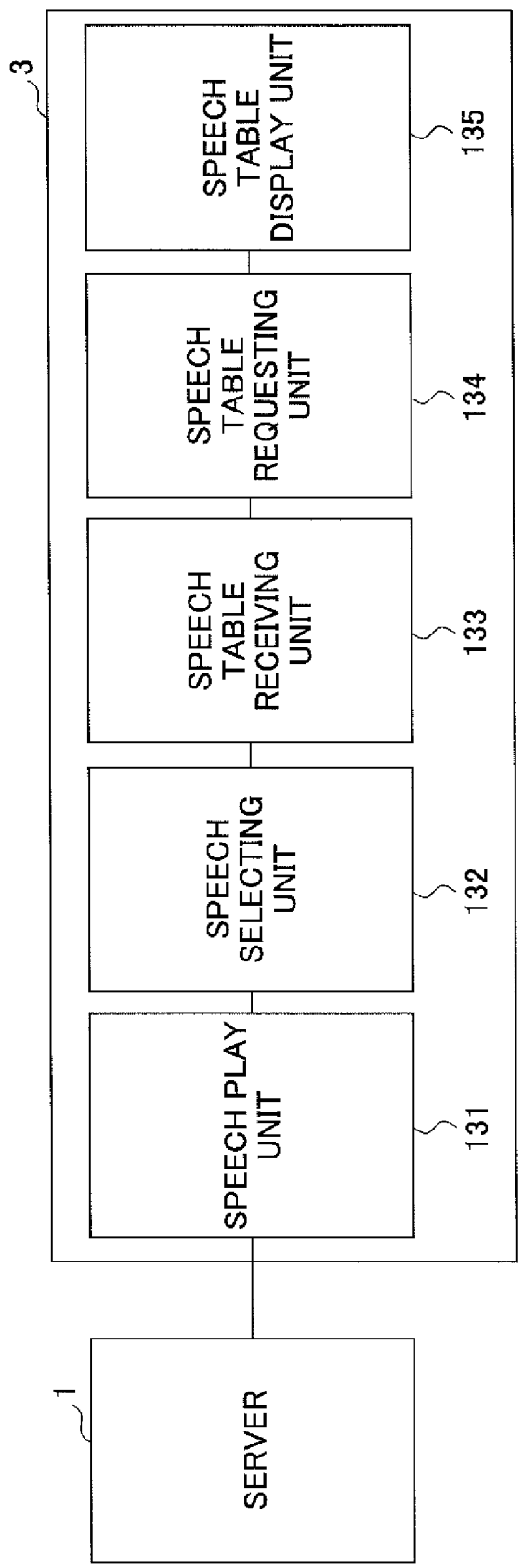
FIG. 29 is a function configuration diagram of the administrator terminal.

FIG. 29 is a function configuration diagram of the administrator terminal 3. The administrator terminal 3 includes a speech play unit 131, a speech selecting unit 132, a speech table receiving unit 133, a speech table requesting unit 134, and a speech table display unit 135.

The speech play unit 131 plays a play speech selected by the server 1. The speech selecting unit 132 receives a selection of a speech, when any one of the frames 304 of speeches of the operator and the customer in the speech table 300 is clicked with a mouse. The speech table receiving unit 133 receives a speech table from the server 1. The speech table requesting unit 134 makes a speech table display request to the server 1. The speech table display unit 135 displays the speech table 300 as illustrated in FIGS. 23 through 26, on the display device 71.

Figure 30:
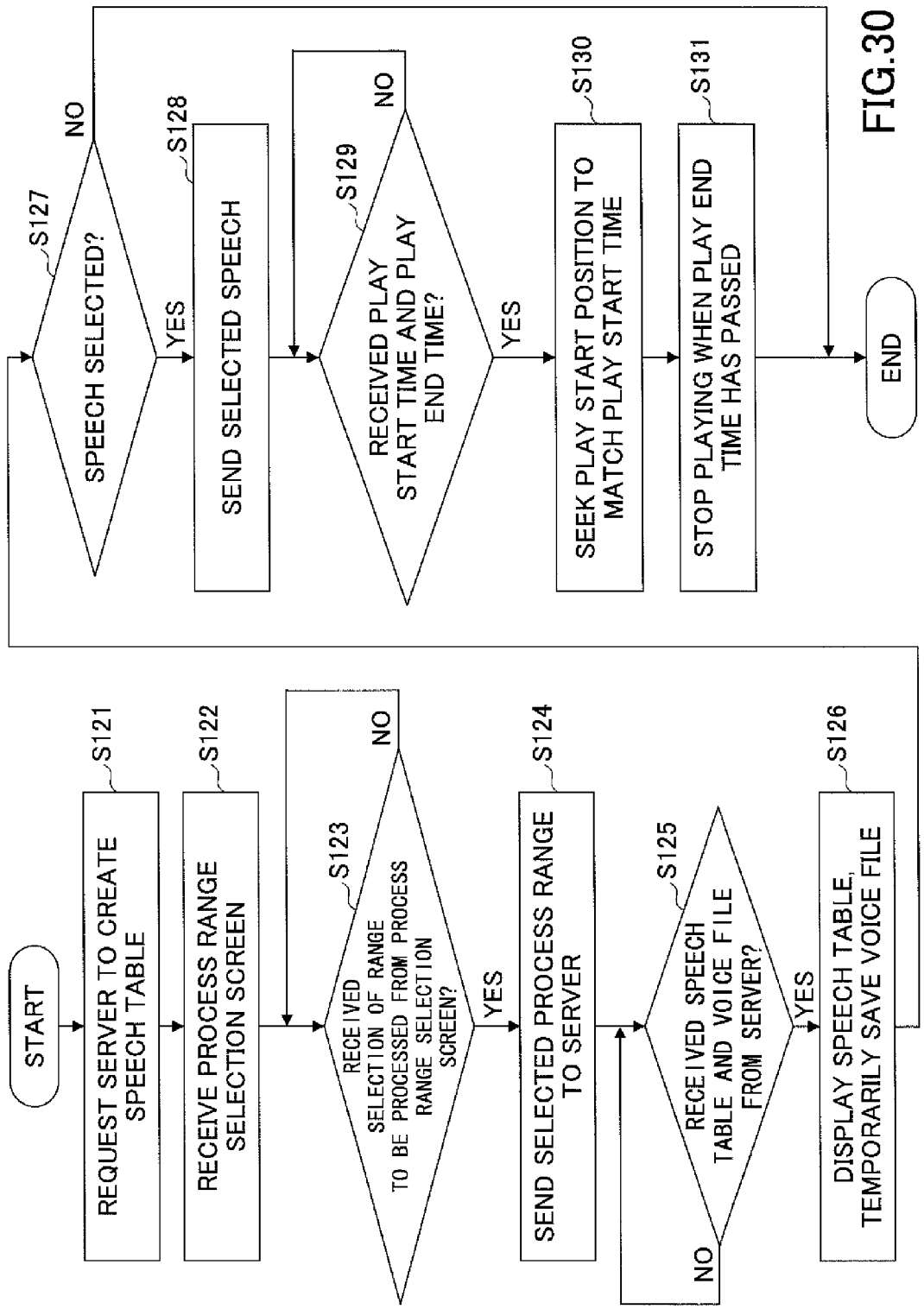
FIG. 30 is a flowchart of a process performed by the administrator terminal.

FIG. 30 is a flowchart of an example of a process of the administrator terminal 3. In step S121, the speech table requesting unit 134 of the administrator terminal 3 requests the server 1 to create a speech table. In step S122, the speech table requesting unit 134 receives the process range selection screen 200 from the administrator terminal 3.

In step S123, the speech table requesting unit 134 displays the process range selection screen 200, and prompts the administrator to input selection information of the process range. Until the speech table requesting unit 134 determines that selection information of the process range is input by the administrator, the process of step S123 is repeated.

When selection information of the process range is input by the administrator, in step S124, the speech table requesting unit 134 sends selection information of the process range (specification of call ID or specification of condition (date range or operator ID)) to the server 1. Until the data of the speech table 300 and the voice file are received from the server 1, the speech table receiving unit 133 repeats the process of step S125.

When the data of the speech table 300 and the voice file are received from the server 1, in step S126, the speech table display unit 135 displays the speech table 300 on the display device 71. Furthermore, the speech table display unit 135 temporarily saves the voice file.

In step S127, when any one of the frames 304 in the speech table 300 are clicked with a mouse, the speech selecting unit 132 determines that a speech has been selected. When the speech selecting unit 132 determines that a speech has been selected, the speech selecting unit 132 reports the selected play speech to the server 1. The speech play unit 131 repeats the process of step S129 until a speech start time and a speech end time of the play speech are received from the server 1.

When a speech start time and a speech end time of the play speech are received from the server 1, in step S130, the speech play unit 131 seeks a play start position of the voice file to match the speech start time, and plays the voice file. In step S131, when the speech end time passes, the speech play unit 131 stops playing the voice file, and ends the process of the flowchart of FIG. 30. In step S127, when the speech selecting unit 132 determines that a speech is not selected, the process of the flowchart of FIG. 30 is ended.

According to the server 1 of the present embodiment, the speech table 300 as illustrated in FIGS. 23 through 26 may be created and sent to the administrator terminal 3. The speech table 300 indicates objects displayed on the screen on the operator terminal 2 by the operator, in coordination with the graph indicating the respective speech time periods of the operator and the customer.

Furthermore, the server 1 according to the present embodiment determines that there is a relationship between the speeches of the operator and the customer included in the range from the page switch time to the threshold time, and plays both speeches even when either one of the speech of the operator or the speech of the customer is selected.

By using the speech table 300, the administrator is presented with the display time period and the display contents of the displayed information of the manual. Therefore, the administrator may predict, to some extent, the contents of the speech, before playing the speeches of the operator and the customer that have been recorded.

Furthermore, the administrator is able to play both the speeches of the operator and the customer which are highly likely to be related to each other by only selecting one of the speeches of the operator and the customer that are highly likely to be related to each other included in the range from the page switch time to the threshold time, and therefore the operations of selecting speeches are reduced.

A speech recording unit corresponds to the speech time DB 17. A display recording unit corresponds to the page switch DB 19. A content recording unit corresponds to the manual DB 18. A providing unit corresponds to the speech table sending unit 111. A determining unit corresponds to the play speech determining unit 110. Telephone call information corresponds to the speech table 300. A threshold recording unit corresponds to the threshold DB 20. An operator evaluation support program corresponds to the speech play program 22.

The elements, expressions, and arbitrary combinations of elements according to an embodiment of the present invention may be applied to a method, a device, a system, a computer program, a recording medium, and a data structure, which are also valid as an embodiment of the present invention.

According to an aspect of the embodiments, an operator evaluation support device and an operator evaluation support method are provided, by which the operations for selecting voice files of the speeches of the customer and the operator are reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operator evaluation support device comprising:
a speech recording unit configured to record speech times of a customer and an operator during a telephone call from the customer to which the operator attends;
a display recording unit configured to record a display time during which a display screen is displayed during the telephone call on an operator terminal used by the operator, in association with display screen identification information for identifying the display screen;
a content recording unit configured to record screen content information describing a content of the display screen, in association with the display screen identification information of the display screen displayed on the operator terminal;
a providing unit configured to
refer to the speech recording unit, the display recording unit, and the content recording unit with respect to the telephone call,
create telephone call information indicating the speech times of the customer and the operator, the display time of the display screen displayed on the operator terminal, and the screen content information corresponding to the display screen, and
send the telephone call information and voice files of speeches of the customer and the operator included in the telephone call information to an administrator terminal used by an administrator who is evaluating the operator; and
a determining unit configured to
receive, from the administrator terminal, a selection of one of the speeches of the customer and the operator included in the telephone call information,
determine whether the selected speech is included in a predetermined time from a switching timing of the display screen displayed on the operator terminal, and
determine, when the selected speech is determined as being included in the predetermined time, the selected speech and also the other of the speeches included in the predetermined time as being play speeches.

2. The operator evaluation support device according to claim 1, wherein
the determining unit is configured to refer to the speech recording unit and read the speech time of the selected speech, and refer to the display recording unit and read the switching timing of the display screen, and when the speech time of the selected speech is included in the predetermined time from the switching timing of the display screen, and a speech of another party of the selected speech is included in the predetermined time from the switching timing of the display screen, the determining unit determines, as the play speeches, the selected speech and also the speech of the another party.

3. The operator evaluation support device according to claim 1, further comprising:
a threshold recording unit configured to record a threshold time, wherein
the determining unit is configured to refer to the threshold recording unit, and set, as the predetermined time, a range from the threshold time before the switching timing of the display screen displayed on the operator terminal to the threshold time after the switching timing.

4. The operator evaluation support device according to claim 1, wherein the providing unit is configured to display the speech times of the customer and the operator and the display time of the display screen during the telephone call based on a time axis.

5. An operator evaluation support method executed by a computer, the operator evaluation support method comprising:
referring to a display recording unit that records a display time during which a display screen is displayed on an operator terminal used by an operator during a telephone call from a customer to which the operator attends, the display time being recorded in association with display screen identification information for identifying the display screen, and identifying the display screen identification information and the display time of the display screen displayed on the operator terminal during the telephone call;
referring to a content recording unit that records screen content information describing a content of the display screen, in association with the display screen identification information of the display screen displayed on the operator terminal, and identifying the screen content information corresponding to the display screen identification information that has been identified;
referring to a speech recording unit that records speech times of the customer and the operator during the telephone call, and identifying the speech times of the customer and the operator during the telephone call;
creating telephone call information indicating the identified speech times of the customer and the operator, the identified display time of the display screen displayed on the operator terminal, and the identified screen content information corresponding to the display screen, with respect to the telephone call;
sending the telephone call information and voice files of speeches of the customer and the operator included in the telephone call information to an administrator terminal used by an administrator who is evaluating the operator;
receiving, from the administrator terminal, a selection of one of the speeches of the customer and the operator included in the telephone call information;
determining whether the selected speech is included in a predetermined time from a switching timing of the display screen displayed on the operator terminal; and
determining, when the selected speech is determined as being included in the predetermined time, the selected speech and also the other of the speeches included in the predetermined time as being play speeches.

6. The operator evaluation support method according to claim 5, further comprising:
referring to the speech recording unit and reading the speech time of the selected speech, and referring to the display recording unit and reading the switching timing of the display screen, and when the speech time of the selected speech is included in the predetermined time from the switching timing of the display screen, and a speech of another party of the selected speech is included in the predetermined time from the switching timing of the display screen, determining, as the play speeches, the selected speech and also the speech of the another party.

7. The operator evaluation support method according to claim 5, further comprising:
referring to a threshold recording unit recording a threshold time, and setting, as the predetermined time, a range from the threshold time before the switching timing of the display screen displayed on the operator terminal to the threshold time after the switching timing.

8. The operator evaluation support method according to claim 5, further comprising:
    displaying the speech times of the customer and the operator and the display time of the display screen during the telephone call based on a time axis.

9. A non-transitory computer-readable recording medium storing an operator evaluation support program that causes a computer to execute a process comprising:
    referring to a display recording unit that records a display time during which a display screen is displayed on an operator terminal used by an operator during a telephone call from a customer to which the operator attends, the display time being recorded in association with display screen identification information for identifying the display screen, and identifying the display screen identification information and the display time of the display screen displayed on the operator terminal during the telephone call;
    referring to a content recording unit that records screen content information describing a content of the display screen, in association with the display screen identification information of the display screen displayed on the operator terminal, and identifying the screen content information corresponding to the display screen identification information that has been identified;
    referring to a speech recording unit that records speech times of the customer and the operator during the telephone call, and identifying the speech times of the customer and the operator during the telephone call;
    creating telephone call information indicating the identified speech times of the customer and the operator, the identified display time of the display screen displayed on the operator terminal, and the identified screen content information corresponding to the display screen, with respect to the telephone call;
    sending the telephone call information and voice files of speeches of the customer and the operator included in the telephone call information to an administrator terminal used by an administrator who is evaluating the operator;
    receiving, from the administrator terminal, a selection of one of the speeches of the customer and the operator included in the telephone call information;
    determining whether the selected speech is included in a predetermined time from a switching timing of the display screen displayed on the operator terminal; and
    determining, when the selected speech is determined as being included in the predetermined time, the selected speech and also the other of the speeches included in the predetermined time as being play speeches.

10. The non-transitory computer-readable recording medium according to claim 9, the process further comprising:
    referring to the speech recording unit and reading the speech time of the selected speech, and referring to the display recording unit and reading the switching timing of the display screen, and when the speech time of the selected speech is included in the predetermined time from the switching timing of the display screen, and a speech of another party of the selected speech is included in the predetermined time from the switching timing of the display screen, determining, as the play speeches, the selected speech and also the speech of the another party.

11. The non-transitory computer-readable recording medium according to claim 9, the process further comprising:
    referring to a threshold recording unit recording a threshold time, and setting, as the predetermined time, a range from the threshold time before the switching timing of the display screen displayed on the operator terminal to the threshold time after the switching timing.

12. The non-transitory computer-readable recording medium according to claim 9, the process further comprising:
    displaying the speech times of the customer and the operator and the display time of the display screen during the telephone call based on a time axis.

* * * * *

UNITED STATES PATENT AND TRADEMARK OFFICE
CERTIFICATE OF CORRECTION

| | | |
|---|---|---|
| PATENT NO. | : 8,908,856 B2 | Page 1 of 1 |
| APPLICATION NO. | : 14/020194 | |
| DATED | : December 9, 2014 | |
| INVENTOR(S) | : Naoto Kawashima et al. | |

It is certified that error appears in the above-identified patent and that said Letters Patent is hereby corrected as shown below:

On the Title Page

Item [56] Foreign Patent Documents, Add -- JP 2007-257031 10/2007 --

Item [56] Foreign Patent Documents, Add -- JP 2008-176223 07/2008 --

Item [56] Foreign Patent Documents, Add -- JP 2009-246589 10/2009 --

Item [56] Foreign Patent Documents, Add -- JP 2010-282647 12/2010 --

Item [56] Other Publications, Add -- Patent Abstracts of Japan, Japanese Publication No. 2007-257031 published October 4, 2007 --

Item [56] Other Publications, Add -- Patent Abstracts of Japan, Japanese Publication No. 2008-176223 published July 31, 2008 --

Item [56] Other Publications, Add -- Patent Abstracts of Japan, Japanese Publication No. 2009-246589 published October 22, 2009 --

Item [56] Other Publications, Add -- Patent Abstracts of Japan, Japanese Publication No. 2010-282647 published December 16, 2010 --

Item [56] Other Publications, Add -- Japanese Office Action mailed on September 24, 2014 in Japanese Application No. 2013-503265 (corresponding to U.S. Serial No. 14/017,733) --

Signed and Sealed this
Fifth Day of May, 2015

Michelle K. Lee
*Director of the United States Patent and Trademark Office*